United States Patent
Al Hamouz et al.

(10) Patent No.: US 9,051,197 B2
(45) Date of Patent: Jun. 9, 2015

(54) CROSS-LINKED POLYAMINOMETHYLDIPHOSPHONATE FOR THE REMOVAL OF METAL IONS FROM WASTEWATER

(71) Applicant: KING FAHD UNIVERSITY OF PETROLEUM AND MINERALS, Dhahran (SA)

(72) Inventors: Othman Charles Sadeq Othman Al Hamouz, Dhahran (SA); Shaikh Asrof Ali, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 95 days.

(21) Appl. No.: 14/022,205

(22) Filed: Sep. 9, 2013

(65) Prior Publication Data

US 2015/0073097 A1    Mar. 12, 2015

(51) Int. Cl.
C02F 1/42       (2006.01)
C08F 26/06      (2006.01)
C08G 75/20      (2006.01)

(52) U.S. Cl.
CPC ............ *C02F 1/42* (2013.01); *C02F 2001/425* (2013.01)

(58) Field of Classification Search
CPC ............ C02F 1/42; C02F 20/42; C08F 26/06; C08G 75/20
USPC ...................................... 521/31, 25; 526/263
See application file for complete search history.

(56) References Cited

U.S. PATENT DOCUMENTS

| | | | |
|---|---|---|---|
| 2,611,768 A | 9/1952 | Butler et al. | |
| 2,687,382 A | 8/1954 | Butler et al. | |
| 3,862,059 A | 1/1975 | Greco et al. | |
| 4,715,962 A | 12/1987 | Bhattacharyya et al. | |
| 6,646,083 B2 | 11/2003 | Hirano et al. | |
| 2011/0281197 A1* | 11/2011 | Daikoku et al. | 429/480 |

OTHER PUBLICATIONS

Al Hamouz, Othman Charles S. et al., "Removal of Heavy Metal Ions Using a Novel Cross-linked Polyzwitterionic Phosphonate", Separation and Purification Technology, 98, 94-101, Sep. 19, 2012.
Bicak, Niyazi et al., "New Strong Cationic Hydrogels: Preparation of N,N,N'N'-Tetraallyl Piperazinium Dibromide and Its Copolymers with N,N-Diallyl Morpholinium Bromide", Journal of Polymer Science; Part A: Polymer Chemistry, 38, 1006-1013, 2000.
Korpe, Sinan et al., "Crosslinked DADMAC Polymers as Cationic Super Absorbents", Reactive and Functional Polymers, 69, 660-665, 2009.

* cited by examiner

*Primary Examiner* — Michael M Bernshteyn
(74) *Attorney, Agent, or Firm* — Richard C Litman

(57) ABSTRACT

The cross-linked polyaminodiphosphonate for the removal of metal ions from wastewater is a cross-linked anionic polyelectrolyte synthesized via cyclocopolymerization of diallylaminomethyldiphosphonic acid and 1,1,4,4-tetraallylpiperazinium dichloride (10 mol %), a cross-linker, in the presence of tert-butylhydroperoxide in aqueous solution at 85° C., followed by treatment with NaOH. The cross-linked polyaminodiphosphonate may be used to remove copper and cadmium ions from wastewater. The adsorption process is spontaneous and endothermic in nature, with negative and positive values for $\Delta G$ and $\Delta H$, respectively. The efficiency of $Cu^{2+}$ and $Cd^{2+}$ removal by the cross-linked polyaminodiphosphonate was found to be 96.8% and 93.8%, respectively.

2 Claims, 31 Drawing Sheets

Lagergren First and second-order kinetic model parameters for the adsorption of $Cu^{2+}$ and $Cd^{2+}$ ions on CAPE 5

| Metal ion | Temp (K) | $q_{e,exp}$ (mg g$^{-1}$) | Lagergren first-order | | | Lagergren second-order | | | | |
|---|---|---|---|---|---|---|---|---|---|---|
| | | | $k_1$ (h$^{-1}$) | $q_{e,cal}$ (mg g$^{-1}$) | $R^2$ | $k_2$ (h$^{-1}$g mg$^{-1}$) | $h^a$ (h$^{-1}$g$^{-1}$ mg) | $q_{e,cal}$ (mg g$^{-1}$) | $R^2$ | $E_a$ (kJ mol$^{-1}$) |
| $Cu^{2+}$ | 296 | 0.600 | 2.53 | 0.122 | 0.9792 | 64.2 | 23.4 | 0.604 | 1 | |
| | 308 | 0.618 | 2.66 | 0.108 | 0.9302 | 78.7 | 30.4 | 0.622 | 1 | 18.3 |
| | 323 | 0.637 | 3.43 | 0.097 | 0.9039 | 118.9 | 48.5 | 0.639 | 1 | |
| $Cd^{2+}$ | 296 | 0.570 | 2.38 | 0.230 | 0.9860 | 28.1 | 9.43 | 0.580 | 1 | |
| | 308 | 0.590 | 2.51 | 0.193 | 0.9794 | 37.4 | 13.3 | 0.597 | 1 | 11.6 |
| | 323 | 0.615 | 2.79 | 0.195 | 0.9965 | 41.8 | 16.1 | 0.621 | 1 | |

*Fig. 13*

Ionic radius, effective hydrated ionic radius, hydration energy, electronegativity, and hardness Index of $Cu^{2+}$ and $Cd^{2+}$ ions

| Metal ion | Ionic radius (nm) | Hydration energy (kJ mol$^{-1}$) | Electronegativity (Pauling) | Hardness Index |
|---|---|---|---|---|
| $Cu^{2+}$ | 0.087 | -2174 | 1.90 | 0.115 |
| $Cd^{2+}$ | 0.124 | -1882 | 1.69 | 0.081 |

*Fig. 14*

Intraparticle Diffusion coefficients and intercept values for the adsorption of $Cu^{2+}$ and $Cd^{2+}$ ions on CAPE 5 at different temperatures.

| Metal ion | Temp (K) | $K_i$ (mg g$^{-1}$ h$^{0.5}$) | Intercept values ($x_i$) | $R^2$ |
|---|---|---|---|---|
| $Cu^{2+}$ | 296 | 0.0708 | 0.5188 | 0.9929 |
|  | 308 | 0.0427 | 0.5662 | 0.9914 |
|  | 323 | 0.0217 | 0.6108 | 0.9743 |
| $Cd^{2+}$ | 296 | 0.136 | 0.4123 | 0.9991 |
|  | 308 | 0.114 | 0.4586 | 0.9877 |
|  | 323 | 0.109 | 0.4941 | 0.9896 |

Fig. 15

Langmuir and Freundlich isotherm model constants for $Cu^{2+}$ and $Cd^{2+}$ adsorption at different temperatures.

| Metal ion | Temperature (K) | Langmuir isotherm model | | | Freundlich isotherm model | | | |
|---|---|---|---|---|---|---|---|---|
| | | $Q_m$ (mg g$^{-1}$) | b (L mg$^{-1}$) | $R^2$ | $k_f$ | n | 1/n | $R^2$ |
| $Cu^{2+}$ | 296 | 0.79 | 29.3 | 0.9946 | 2.26 | 1.82 | 0.55 | 0.9817 |
| | 308 | 0.85 | 39.3 | 0.9934 | 3.39 | 1.69 | 0.59 | 0.9507 |
| | 323 | 0.94 | 47.4 | 0.9945 | 4.97 | 1.60 | 0.63 | 0.9709 |
| $Cd^{2+}$ | 296 | 0.87 | 12.8 | 0.9976 | 2.06 | 1.60 | 0.63 | 0.9909 |
| | 308 | 0.93 | 14.6 | 0.9914 | 2.48 | 1.57 | 0.64 | 0.9936 |
| | 323 | 0.96 | 23.0 | 0.9967 | 3.42 | 1.56 | 0.64 | 0.9881 |

Fig. 16

The $R_L$ values based on the Langmuir isotherm model and % Removal at different initial concentration at different temperatures

| $C_0$ (mg L$^{-1}$) | Cu$^{2+}$ | | | | | |
|---|---|---|---|---|---|---|
| | 23°C | | 35°C | | 50°C | |
| | $R_L$ value | % Removal | $R_L$ value | % Removal | $R_L$ value | % Removal |
| 0.200 | 0.1457 | 96.8 | 0.1129 | 97.5 | 0.0954 | 98.3 |
| 0.400 | 0.0786 | 96.0 | 0.0598 | 97.1 | 0.0501 | 97.9 |
| 0.600 | 0.0538 | 94.5 | 0.0407 | 96.8 | 0.0340 | 97.8 |
| 0.800 | 0.0409 | 92.1 | 0.0308 | 95.6 | 0.0257 | 96.8 |
| 1.000 | 0.0330 | 90.0 | 0.0248 | 92.7 | 0.0207 | 95.6 |

| $C_0$ (mg L$^{-1}$) | Cd$^{2+}$ | | | | | |
|---|---|---|---|---|---|---|
| | 23°C | | 35°C | | 50°C | |
| | $R_L$ value | % Removal | $R_L$ value | % Removal | $R_L$ value | % Removal |
| 0.200 | 0.2808 | 93.8 | 0.2551 | 94.9 | 0.1786 | 96.8 |
| 0.400 | 0.1633 | 92.3 | 0.1462 | 93.8 | 0.0980 | 95.8 |
| 0.600 | 0.1152 | 90.5 | 0.1025 | 92.0 | 0.0676 | 95.3 |
| 0.800 | 0.0890 | 88.3 | 0.0789 | 90.4 | 0.0516 | 94.0 |
| 1.000 | 0.0725 | 85.7 | 0.0641 | 88.7 | 0.0417 | 92.3 |

Fig. 17

Thermodynamic Data for Cu$^{2+}$ and Cd$^{2+}$ adsorption on CAPE 5.

| Metal ion | Temperature (K) | ΔG (kJ/mol) | ΔH (kJ/mol) | ΔS (J/mol K) | R$^2$ |
|---|---|---|---|---|---|
| Cu$^{2+}$ | 296 | -4.36 | | | |
| | 308 | -5.58 | 25.8 | 101.8 | 0.9952 |
| | 323 | -7.10 | | | |
| Cd$^{2+}$ | 296 | -3.31 | | | |
| | 308 | -4.29 | 20.8 | 81.6 | 0.9899 |
| | 323 | -5.52 | | | |

*Fig. 18*

CROSS-LINKED POLYAMINOMETHYLDIPHOSPHONATE FOR THE REMOVAL OF METAL IONS FROM WASTEWATER

BACKGROUND OF THE INVENTION

1. Field of the Invention

The present invention relates to polyelectrolytes, and particularly to a cross-linked polyaminomethyldiphosphonate for the removal of metal ions from wastewater.

2. Description of the Related Art

Cross-linked polymeric materials containing chelating functional groups of amine, carboxylate, phosphonate, and other motifs have attracted considerable attention in the separation and removal of toxic metals. Functional groups having aminomethylphosphonate motifs have shown extraordinary chelating properties in the removal of toxic metals from aqueous solutions. Pollution caused by toxic metal ions has been found to have a large negative impact on the environment. Such heavy metal ions as $Cu^{2+}$ and $Cd^{2+}$ metal ions cause various diseases and disorders. For example, copper poisoning can cause liver and kidney damage, as well as irritation of the respiratory system, whereas cadmium can cause nervous system damage, bone damage and other serious illness.

Thus, a cross-linked polyaminodiphosphonate for the removal of metal ions from wastewater solving the aforementioned problems is desired.

SUMMARY OF THE INVENTION

The cross-linked polyaminomethyldiphosphonate for the removal of metal ions from wastewater is a cross-linked anionic polyelectrolyte (referred to herein as CAPE 5) having the formula:

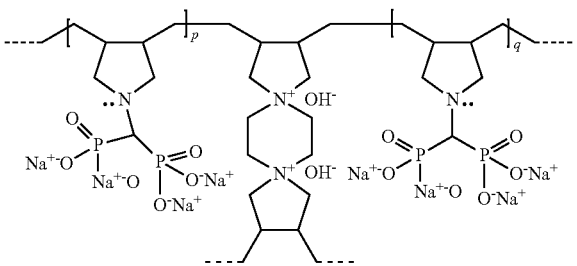

The experimental data for CAPE 5 indicates that the adsorption capacity and rate of adsorption of $Cu^{2+}$ was higher than that of $Cd^{2+}$. The adsorption process is spontaneous and endothermic in nature, with negative and positive values for $\Delta G$ and $\Delta H$, respectively. The low activation energies of 18.3 and 11.6 kJ/mol for $Cu^{2+}$ and $Cd^{2+}$ ions, respectively, indicate that adsorption is a favorable process. In our experiments, the efficiency of $Cu^{2+}$ and $Cd^{2+}$ removal by CAPE 5 was found to be 96.8% and 93.8%, respectively. An efficient synthesis process for CAPE 5, described herein, enables its use in the treatment of contaminated wastewater These and other features of the present invention will become readily apparent upon further review of the following specification and drawings.

BRIEF DESCRIPTION OF THE DRAWINGS

FIG. 13 is a table showing Lagergren first and second-order kinetic model parameters for the adsorption of $Cu^{2+}$ and $Cd^{2+}$ ions on CAPE 5.

FIG. 14 is a table showing ionic radius, hydration energy, electronegativity and hardness index of $Cu^{2+}$ and $Cd^{2+}$ ions.

FIG. 15 is a table showing the intraparticle diffusion coefficients and intercept values for the adsorption of $Cu^{2+}$ and $Cd^{2+}$ ions on CAPE 5 at different temperatures.

FIG. 16 is a table showing Langmuir and Freundlich isotherm model constants for $Cu^{2+}$ and $Cd^{2+}$ adsorption by CAPE 5 at different temperatures.

FIG. 17 is a table showing the $R_L$ values based on the Langmuir isotherm model and % Removal at different initial concentration of $Cu^{2+}$ and $Cd^{2+}$ by CAPE 5 at different temperatures.

FIG. 18 is a table showing thermodynamic data for $Cu^{2+}$ and $Cd^{2+}$ adsorption of CAPE 5.

Similar reference characters denote corresponding features consistently throughout the attached drawings.

DETAILED DESCRIPTION OF THE PREFERRED EMBODIMENTS

The cross-linked polyaminodiphosphonate for the removal of metal ions from wastewater is a cross-linked anionic polyelectrolyte (CAPE 5) having the formula

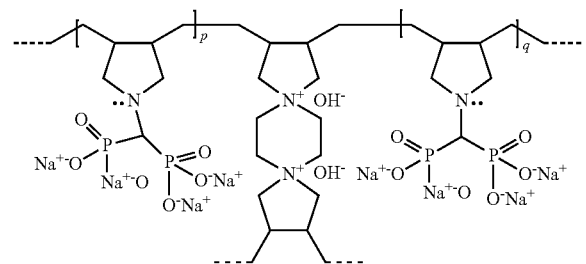

Figure 1:
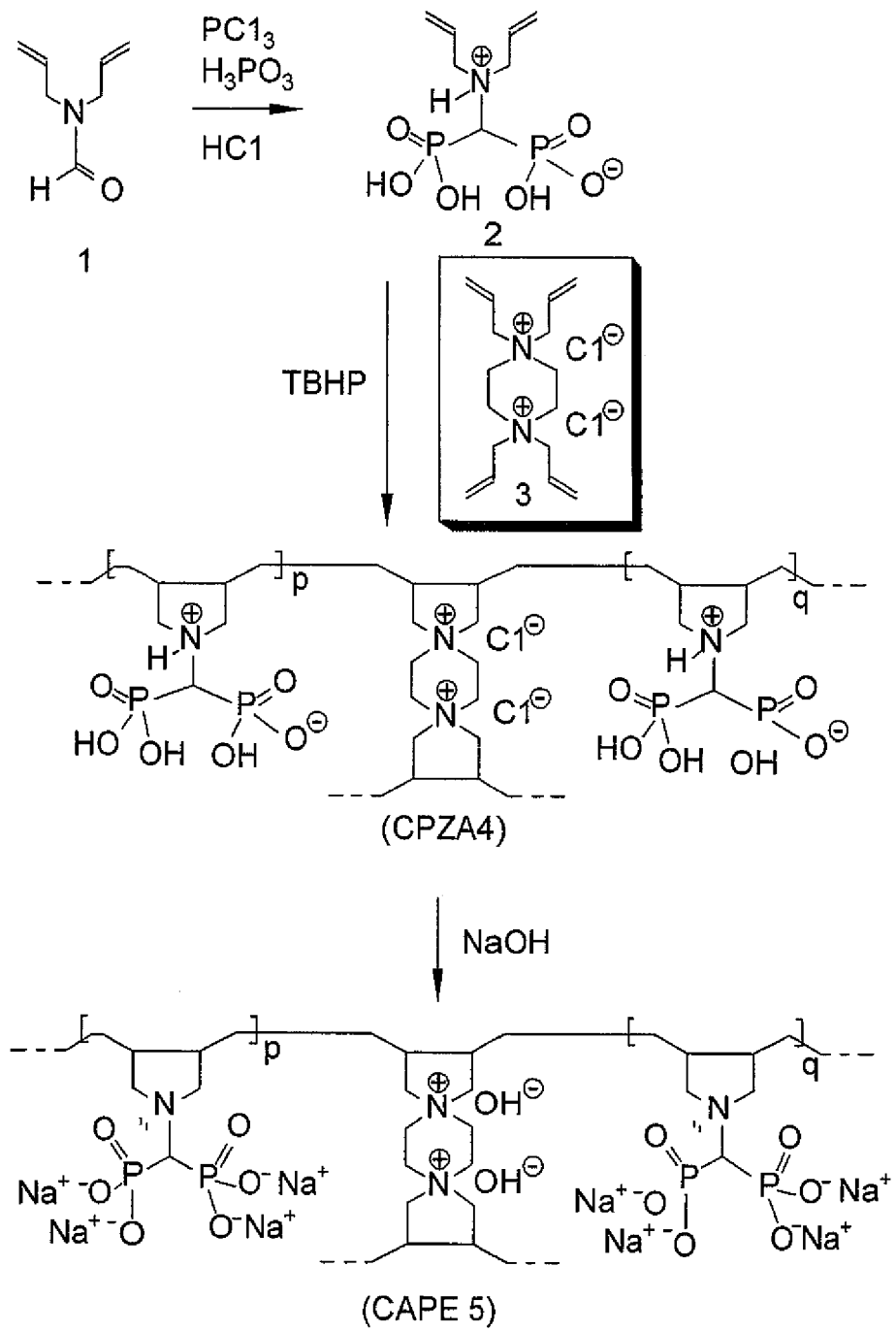
FIG. 1 shows a reaction scheme for the synthesis of monomer and cross-linked polymers CPZA 4 (cross-linked polyzwitterionic acid-4) and CAPE 5 (cross-linked anionic polyelectrolyte 5), the cross-linked polyaminomethyldiphosphonate for the removal of metal ions from wastewater according to the present invention.

The experimental data for CAPE 5 indicates that the adsorption capacity and rate of adsorption of $Cu^{2+}$ was higher than that of $Cd^{2+}$. The adsorption process is spontaneous and endothermic in nature, with negative and positive values for $\Delta G$ and $\Delta H$, respectively. The low activation energies of 18.3 and 11.6 kJ/mol for $Cu^{2+}$ and $Cd^{2+}$ ions, respectively, indicate that adsorption is a favorable process. In our experiments, the efficiency of $Cu^{2+}$ and $Cd^{2+}$ removal by CAPE 5 was found to be 96.8% and 93.8%, respectively. An efficient synthesis process for CAPE 5, described herein, enables its use in the treatment of contaminated wastewater As shown in FIG. 1, diallylaminodiphosphonic acid 2, a zwitterionic acid (ZA) monomer used for the current cyclopolymerization, was prepared using a modified procedure. An aqueous solution of the monomer 2 (90%) and cross-linker 3 (10%) underwent cyclocopolymerization in the presence of initiator TBHP to give a cross-linked polyzwitterionic acid (CPZA 4) as a white solid. To the best of our knowledge this is the first cross-linked polymer that contains an aminomethyldiphosphonic acid motif prepared via Butler's cyclopolymerization protocol. CPZA 4 was found to be in a powder form, which upon treatment with excess NaOH led to the formation of CAPE 5. Elemental analysis of CPZA 4 confirmed the incorporation of monomer 2 and cross-linker 3 to CPZA 4 in an approximate mol ratio of 90:10, which is similar to the feed ratio.

Figure 3:
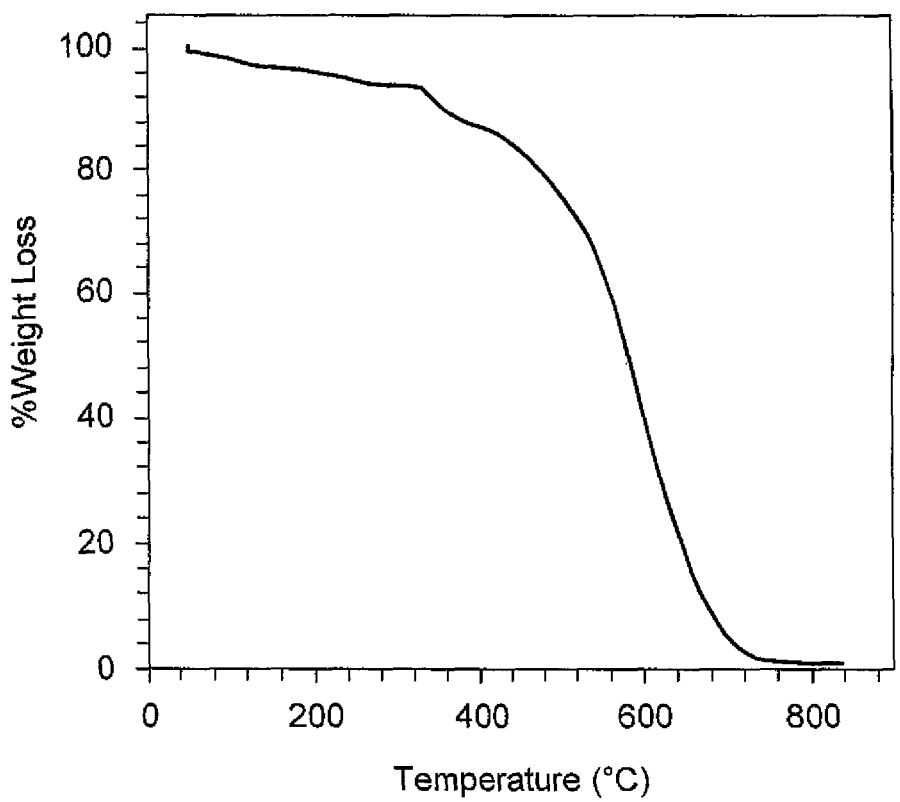
FIG. 3 shown the thermogravimetric (TGA) analysis of the CAPE 5 cross-linked polyaminomethyldiphosphonate for the removal of metal ions from wastewater according to the present invention.

The thermogravimetric analysis (TGA) curve of CAPE 5, shown in FIG. 3, showed two major losses in weight. A first, slow weight loss of 14.0% is attributed to loss of water imbedded inside the cross-linked polymer, and the second, major loss of 85% is the result of combustion of the nitrogenated organic fraction with the release of $CO_2$, $NO_x$ and $H_2O$ gases, mixed with the loss of $H_2O$ and $P_2O_5$ formed by the condensation reaction between the pendent phosphonate groups. The residual mass at 800° C. was found to be 1.0%.

Figure 2A:
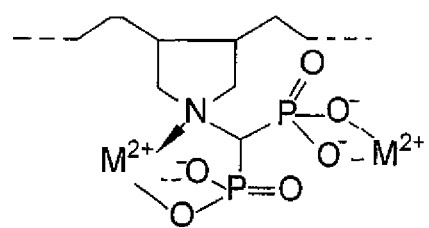
FIG. 2A is a diagram showing the metal complex formed from a metal ion and the aminomethyldiphosphonate moiety acting as a tridentate chelating agent.
Figure 2B:
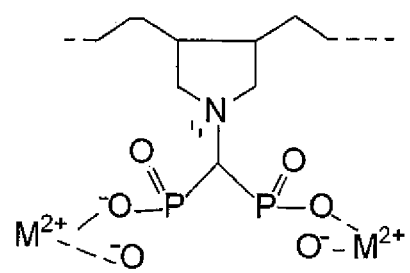
FIG. 2B is a diagram showing the metal complex formed from a metal ion and the aminomethyldiphosphonate moiety acting as a bidentate chelating agent.
Figure 4:
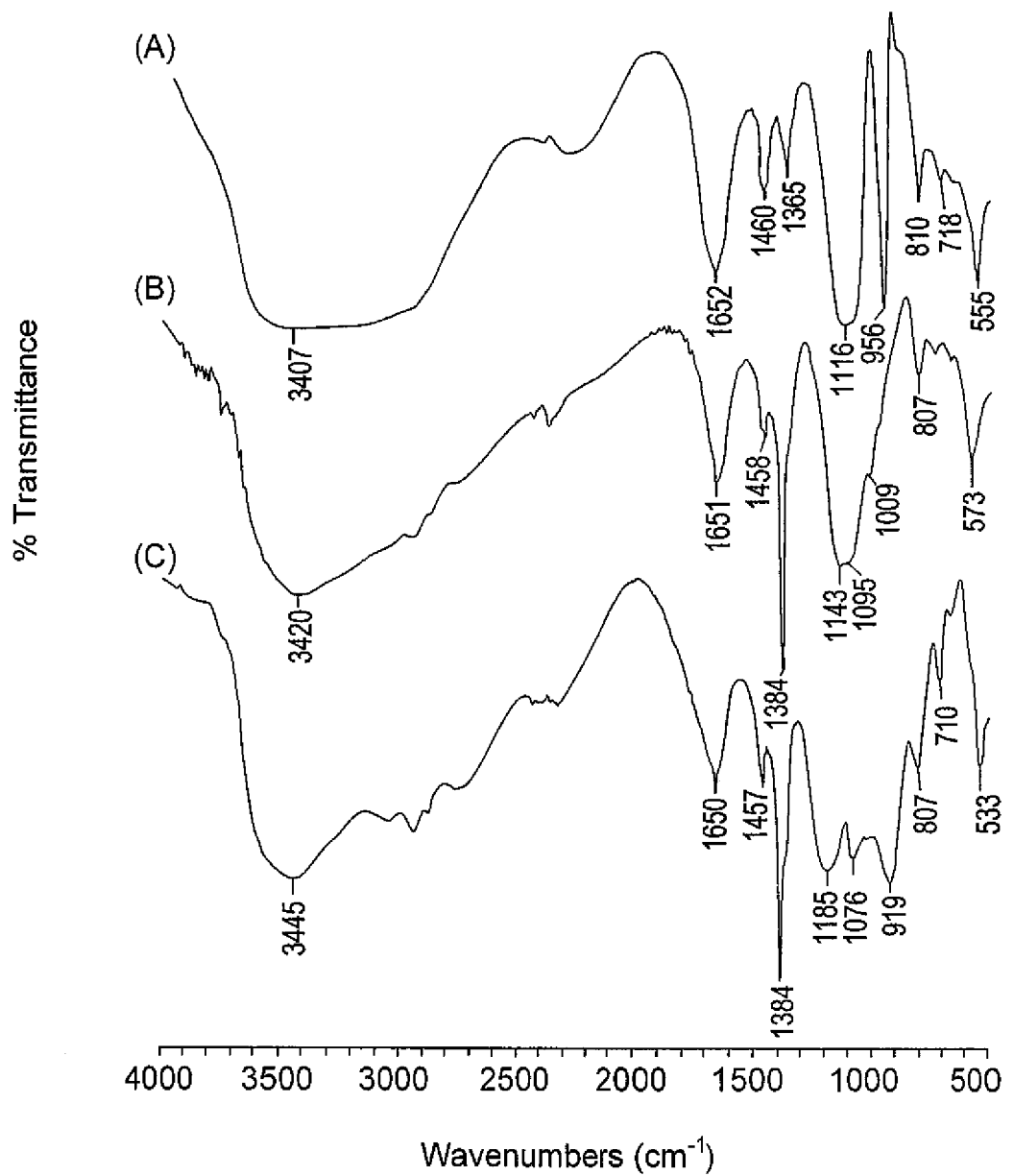
FIG. 4 is the FT-IR spectra for (A) unloaded CAPE 5; (B) CAPE 5 loaded with $Cu^{2+}$; and (C) CAPE 5 loaded with $Cd^{2+}$.

The ion exchange capacity (IEC) of CAPE 5 was found to be 5.98 mmol/g, which indicated the excellent ability of the copolymer to adsorb metal ions ($M^{+2}$) as a result of the presence of chelating ligands of —N and diphosphonate motifs —$[P(=O)(O^-)_2]_2$ (see FIGS. 2A and 2B). The bands in the IR spectrum (FIG. 4, part A) of the CAPE 5 resin in the region of 900-1050 $cm^{-1}$ are attributed to the phosphonate P—O vibrations. The IR spectra of the resin loaded with $Cu^{2+}$ and $Cd^{2+}$ (FIG. 4, parts B and C) revealed the increase in the intensity and broadness of the phosphonate P—O vibrations as a result of the adsorption of the metal ions. The C—N absorption was found near ~1460 $cm^{-1}$. The peaks found around 1650 $cm^{-1}$ were ascribed to the H—O—H bending vibration. The appearance of a new strong band at 1384 $cm^{-1}$ (FIG. 4, parts B and C) was attributed to the presence of an ionic nitrate group, since the adsorption process was carried out in the presence of copper and cadmium nitrates. Interestingly, the presence of these strong bands implies the ability of the resin to act also as an anion exchanger. Note that the absorption band attributed to the nitrate ion is absent in the IR spectrum of the unloaded resin CAPE 5 (FIG. 4, part A).

Figure 5A:
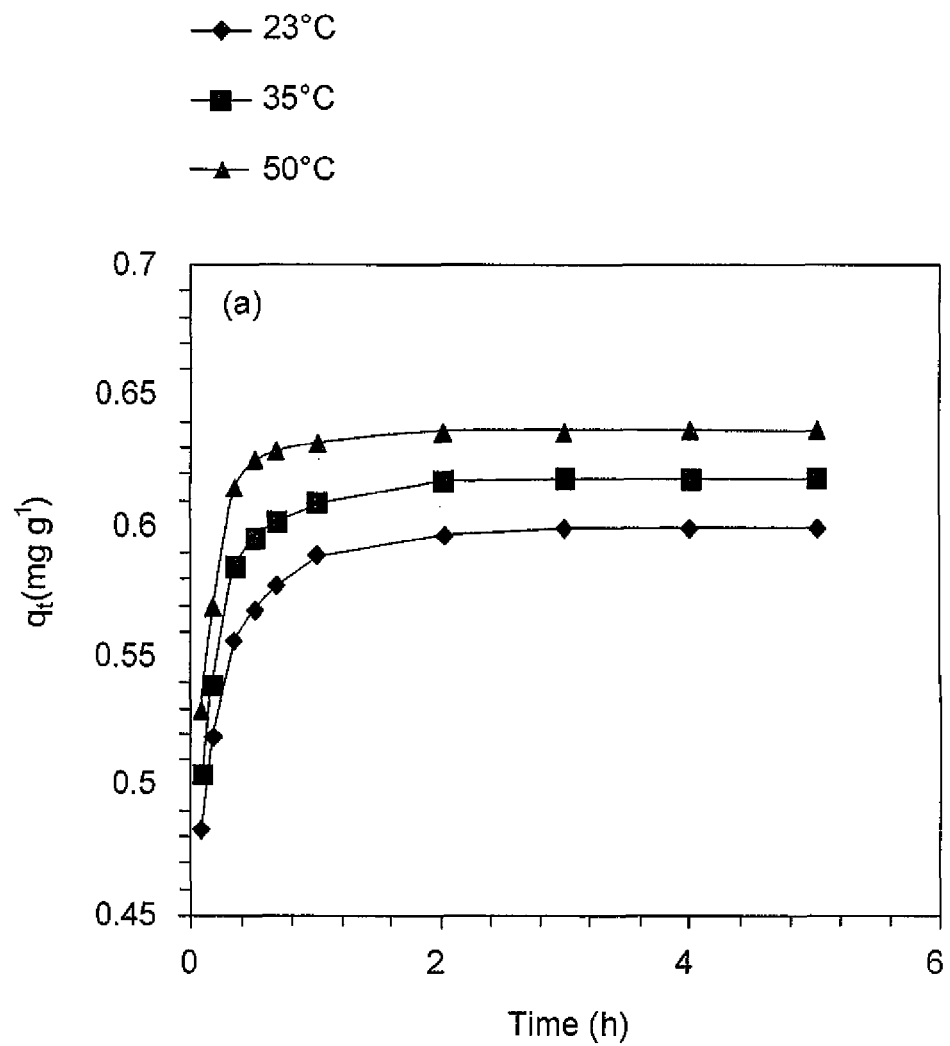
FIG. 5A is a plot showing the effect of time on the adsorption capacity of CAPE 5 for copper.
Figure 6A:
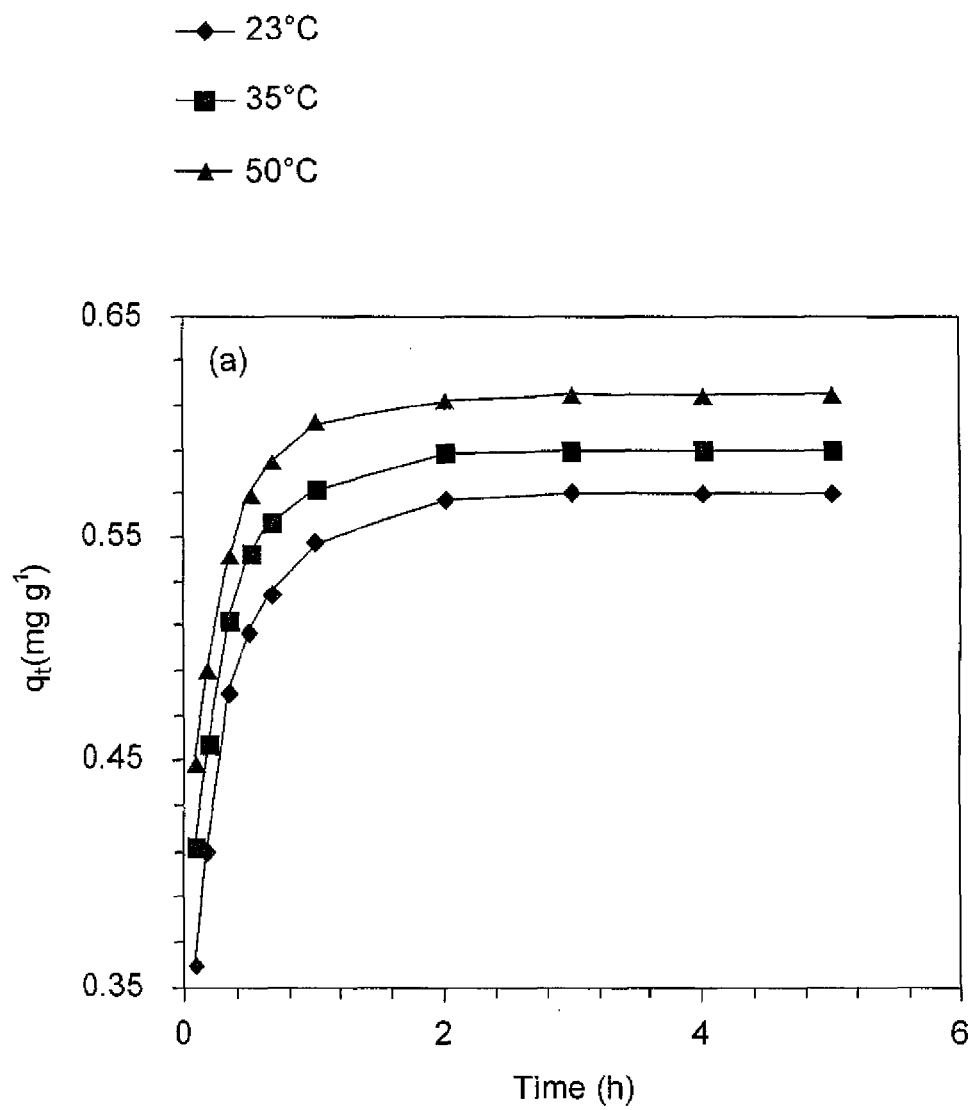
FIG. 6A is a plot showing the effect of time on the adsorption capacity of CAPE 5 for cadmium.

The adsorption kinetics, which describes the relationship between adsorption capacity and adsorption time at different temperatures, is presented in FIGS. 5A and 6A. The adsorption process was found to be fast, and it reached equilibrium within 2 h, indicating the strong ability of CAPE 5 to remove $Cu^{2+}$ and $Cd^{2+}$ ions from aqueous solutions. At higher temperatures, the adsorption capacities increased, indicating larger swelling, allowing more ions to be diffused and adsorbed on CAPE 5.

Figure 5B:
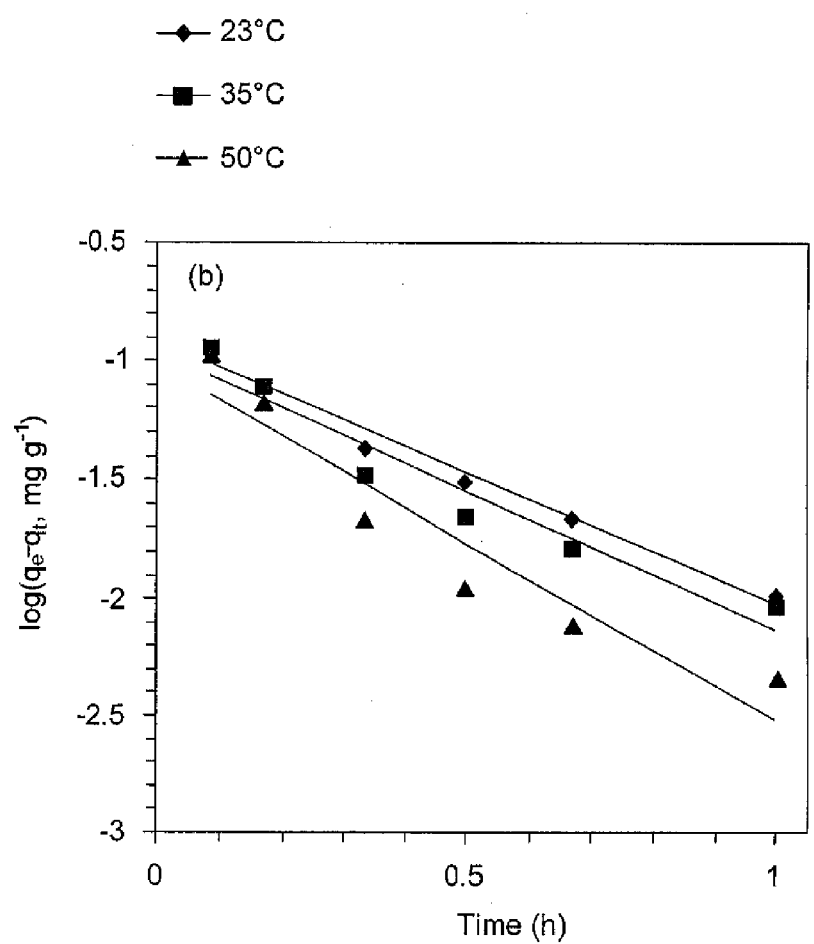
FIG. 5B is a plot showing a Lagergren first-order kinetic model for CAPE 5 and copper.
Figure 6B:
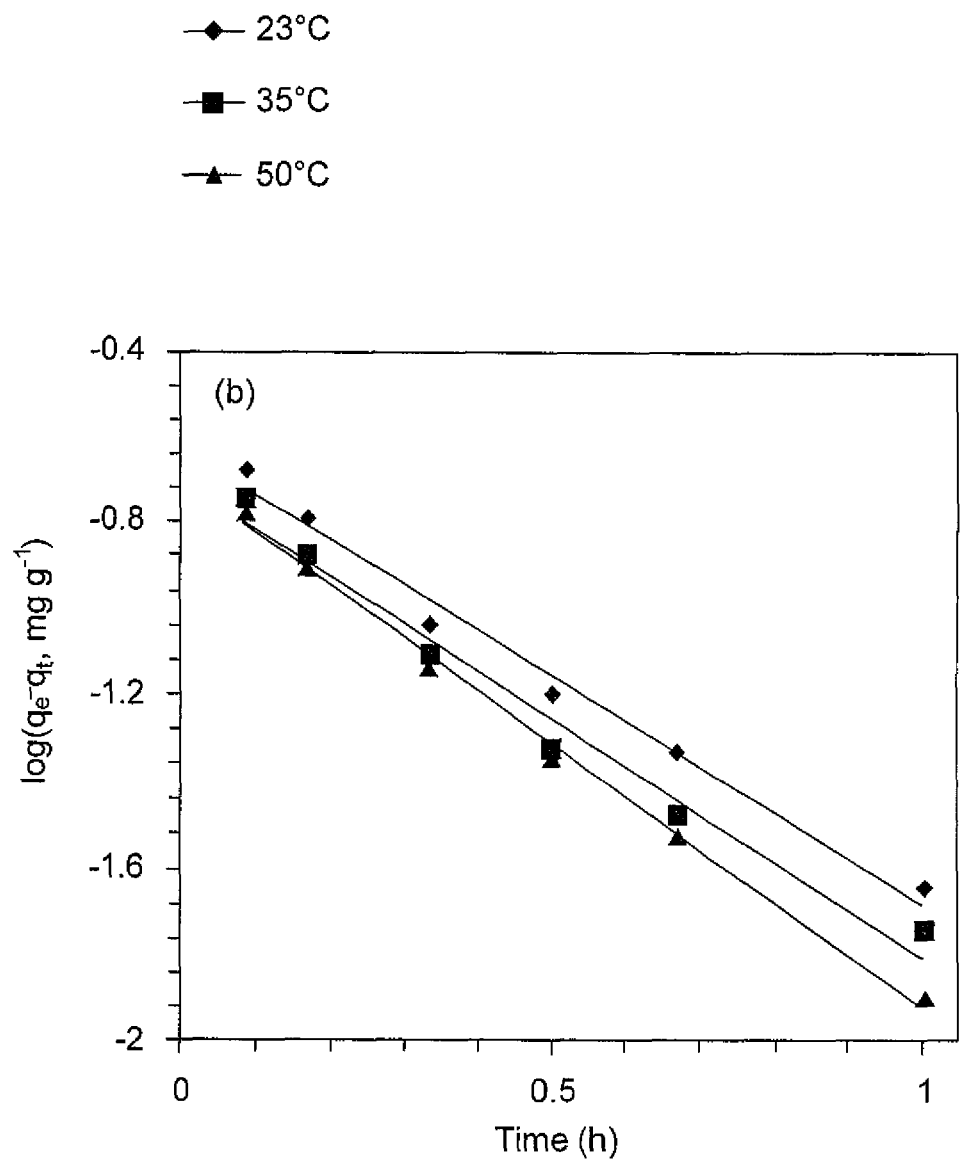
FIG. 6B is a plot showing a Lagergren first-order kinetic model for CAPE 5 and cadmium.

Lagergren first-order kinetics describes the adsorption process in a solid-liquid system based on the adsorption capacity of the solid, where it assumes that one metal ion is adsorbed onto one adsorption site on the surface of the adsorbent. The linear form of the model can be described in the following equation (1):

$$\log(q_e - q_t) = \log q_e - \frac{k_1 t}{2.303} \quad (1)$$

where $q_e$ and $q_t$ (mg $g^{-1}$) are the adsorption capacities at equilibrium and at time t, respectively, and $k_1$ is the first-order rate constant. The $k_1$ and $q_e$ at different temperatures were evaluated experimentally using the slope and intercept of the plots of $\log(q_e-q_t)$ versus t (FIGS. 5B, 6B, and 13). The fitness of the data was found to be relatively good, but not as good as the fitness with Lagergren second-order kinetics. The first-order kinetic data showed that the calculated values of $q_{e,cal}$ are not in agreement with the experimental values $q_{e,exp}$, indicating that the adsorption process didn't fit with Lagergren first-order kinetic model (FIG. 13).

The linear Lagergren second-order kinetic model can be expressed by the following equation (2):

$$\frac{t}{q_t} = \frac{1}{k_2 q_e^2} + \frac{t}{q_e} \quad (2)$$

where $k_2$ is second-order rate constant, and $q_t$ and $q_e$ are the respective adsorption capacities of the metal ions at a time t and at equilibrium.

Figure 5C:
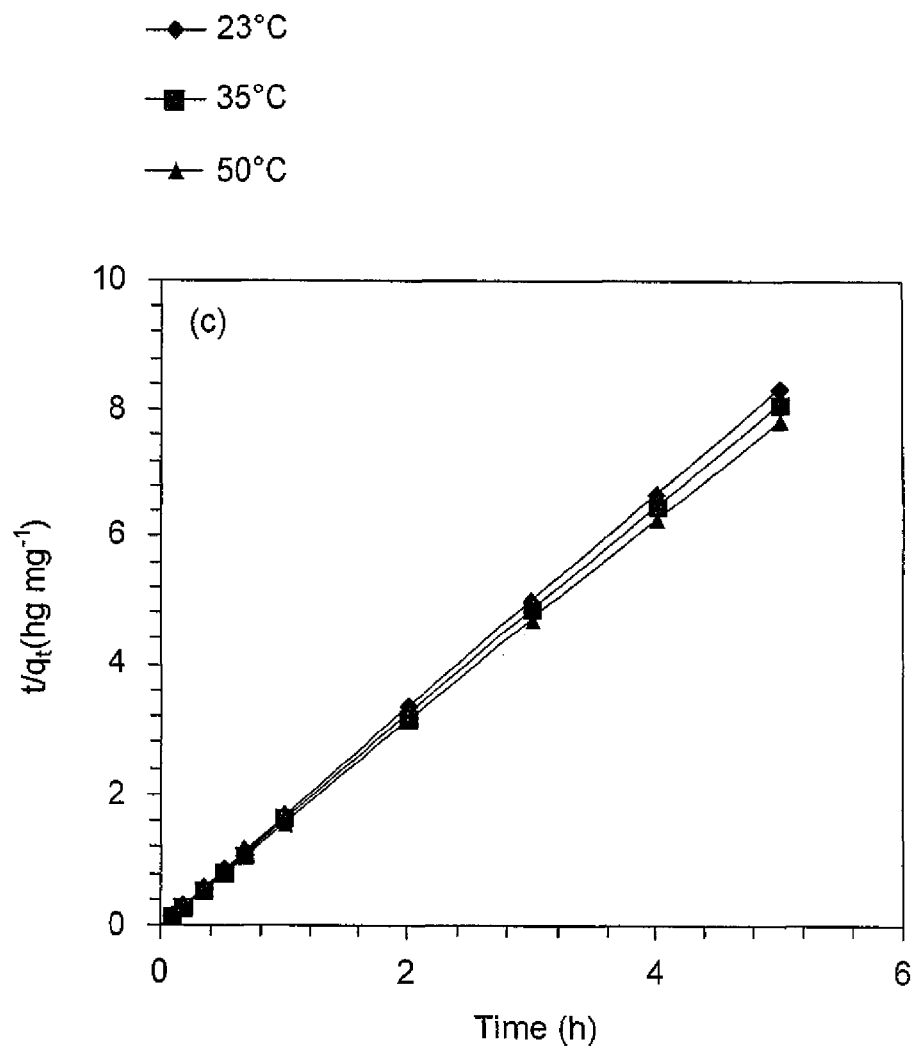
FIG. 5C is a plot showing a Lagergren second-order kinetic model for CAPE 5 and copper.
Figure 6C:
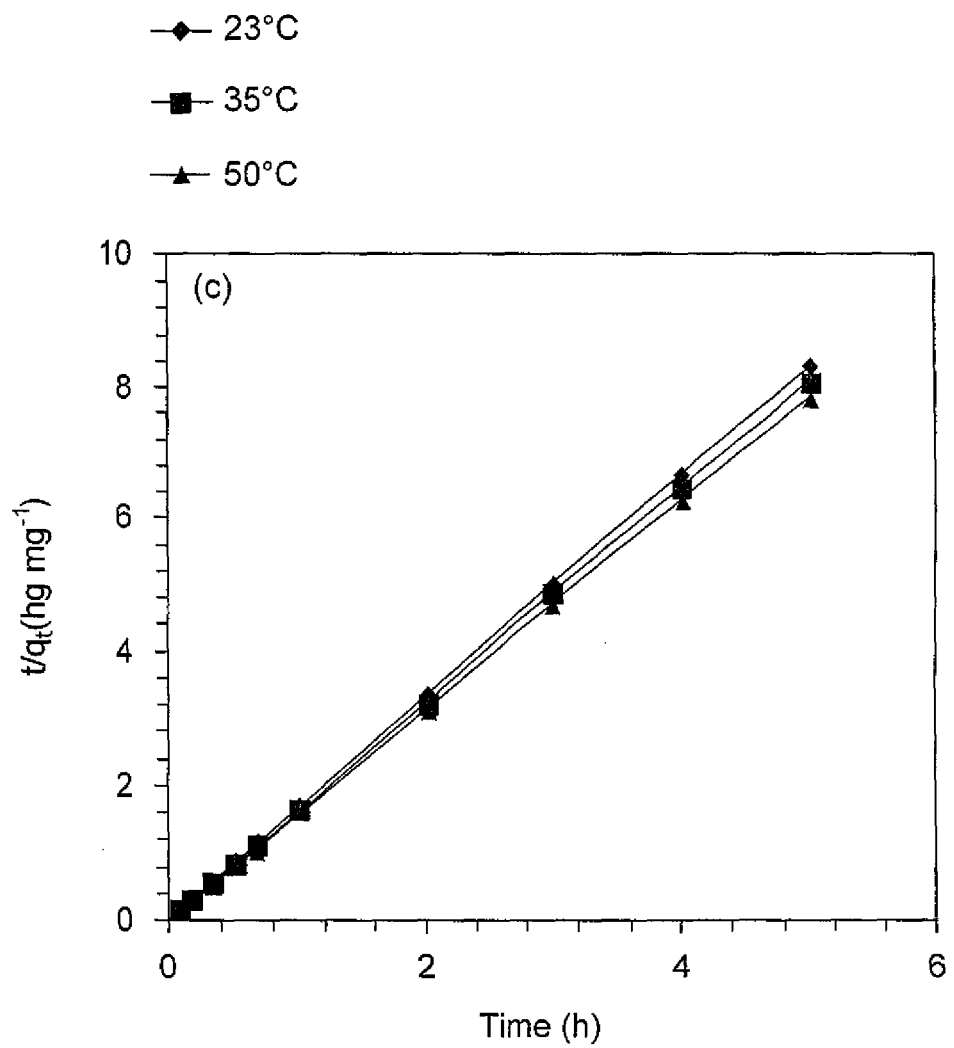
FIG. 6C is a plot showing a Lagergren second-order kinetic model for CAPE 5 and cadmium.

It is evident from FIGS. 5C, 6C, and 13 that the second-order Lagergren kinetic model fitted well the adsorption of $Cu^{2+}$ and $Cd^{2+}$ ions, indicating that the adsorption process might be a chemical adsorption. Also, the equilibrium adsorption capacities ($q_{e,cal}$) derived from Eq. (2) are in close agreement with those observed experimentally ($q_{e,exp}$). It can be noted in FIG. 13 that the higher rate ($k_2$) and adsorption capacities ($q_{e,cal}$) in the case of copper ions than cadmium ions can be explained in terms of ionic radius, electronegativity and the hydration energy. The lower charge density of $Cd^{2+}$ as a result of its larger ionic radius makes it less attractive to the adsorbent in comparison to $Cu^{2+}$, with its smaller ionic radius (FIG. 14). Another factor is electronegativity; where $Cu^{2+}$ has higher electronegativity than $Cd^{2+}$, thus making the former ion more attractive to the adsorbent surface. The experimental data so far revealed that the resin CAPE 5 is an efficient adsorbent for the removal of both copper and cadmium ions from aqueous solutions.

Figure 5D:
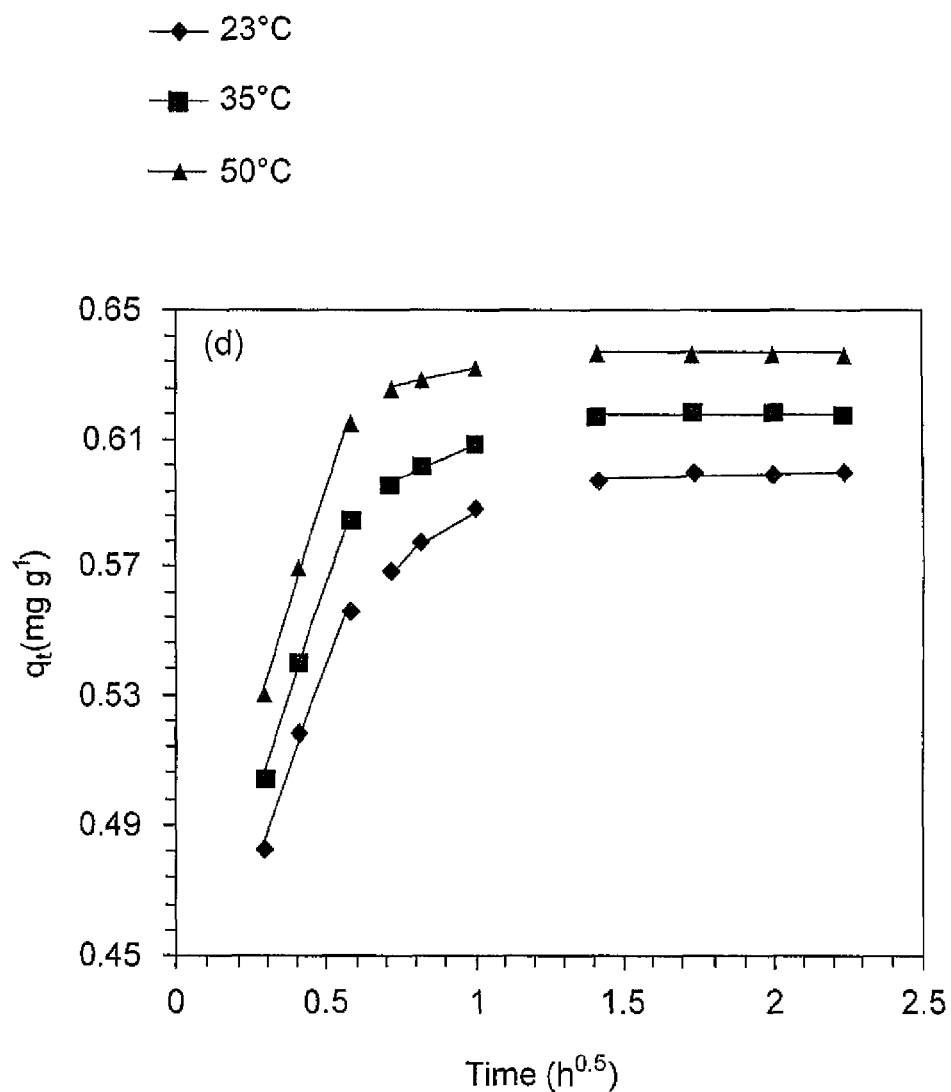
FIG. 5D is a plot showing an intraparticle diffusion model for CAPE 5 and copper.
Figure 6D:
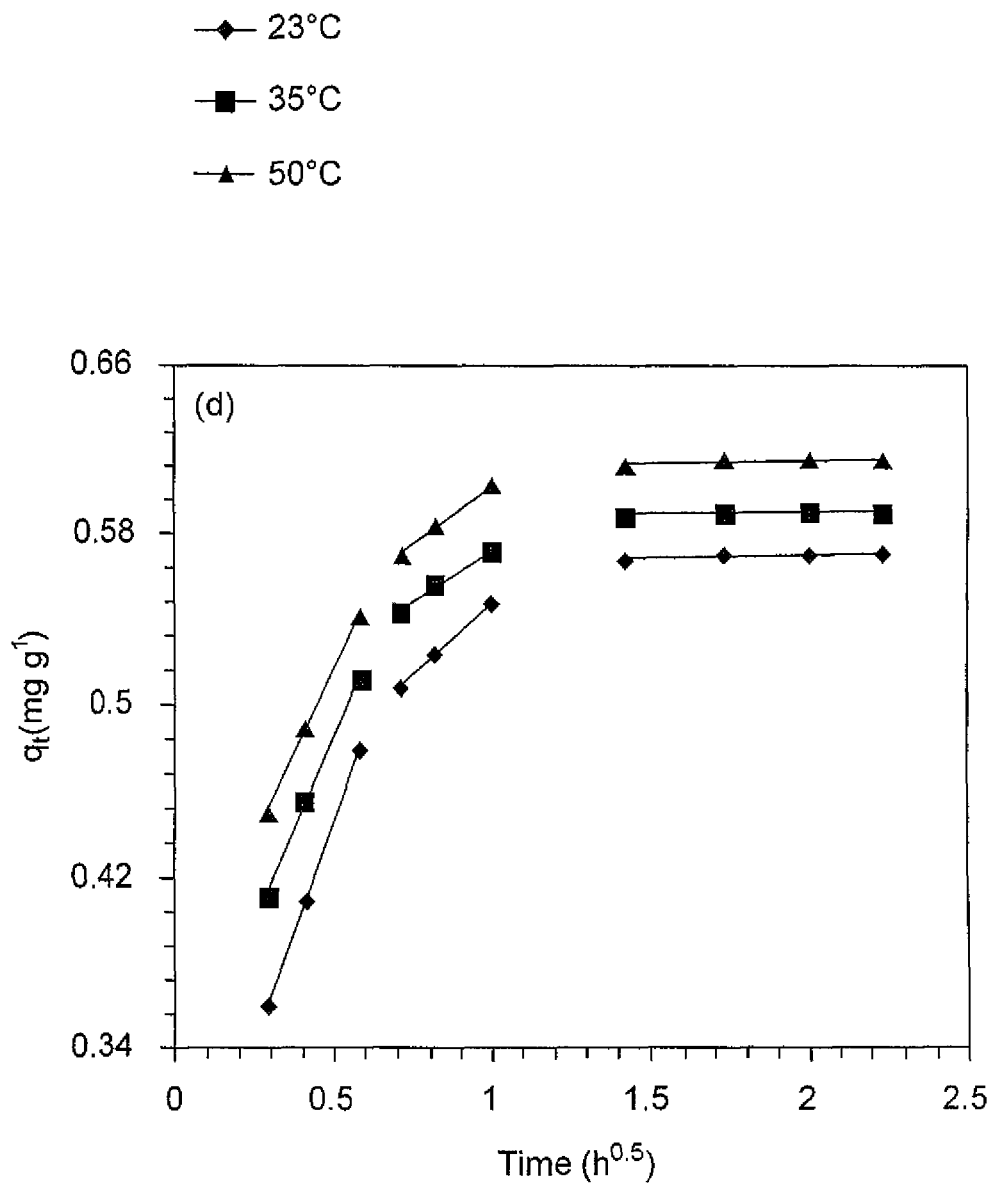
FIG. 6D is a plot showing an intraparticle diffusion model for CAPE 5 and cadmium.

The mechanism of adsorption can be understood by determining the rate-limiting step, and this can be determined by using some adsorption diffusion models, which are always constructed on the basis of three consecutive steps, including (1) film diffusion (i.e., diffusion across the liquid film surrounding the adsorbent particles); (2) intraparticle diffusion (i.e., diffusion in the liquid contained in the pores and/or along the pore walls); and (3) mass action (i.e., physical adsorption and desorption between the adsorbate and active sites). The intraparticle diffusion model assumes that the metal ions are transported from the solution through an interface between the solution and the adsorbent (i.e., film diffusion), followed by a rate-limiting intraparticle diffusion step, which brings them into the pores of the particles in the adsorbent. The following equation expresses the relation of the adsorption capacity and time:

$$q_t = x_i + k_p t^{0.5} \quad (3)$$

where $q_t$ is the adsorption capacity at time t, $k_p$ is the rate constant of intraparticle diffusion, and $x_i$ is related to boundary layer thickness. The adsorption process is governed by the intraparticle diffusion in the case of a straight line fit for the plot of $q_t$ versus $t^{0.5}$. Previous studies showed that intraparticle diffusion plots may contain multilinearity, as observed in our plots (FIGS. 5D and 6D). The curves shown in FIGS. 5D and 6D, however, show that the adsorption happens in three steps: first, rapid diffusion (film diffusion) within 20 min.; second, slow adsorption where intraparticle diffusion occurs (rate-determining step); and finally, the adsorption process reaches equilibrium within 2 h. But, the first stage did not pass through the origin, indicating that the adsorption process is not controlled entirely by intraparticle diffusion. Using the plot of $q_t$ versus $t^{0.5}$, $k_p$ and $x_i$ can be calculated from the slope and intercept, respectively. From the data presented in FIG. 15, the intercept values increase with increasing the temperature, which suggests the higher contribution of the second rate-determining step (surface diffusion).

Figure 7:
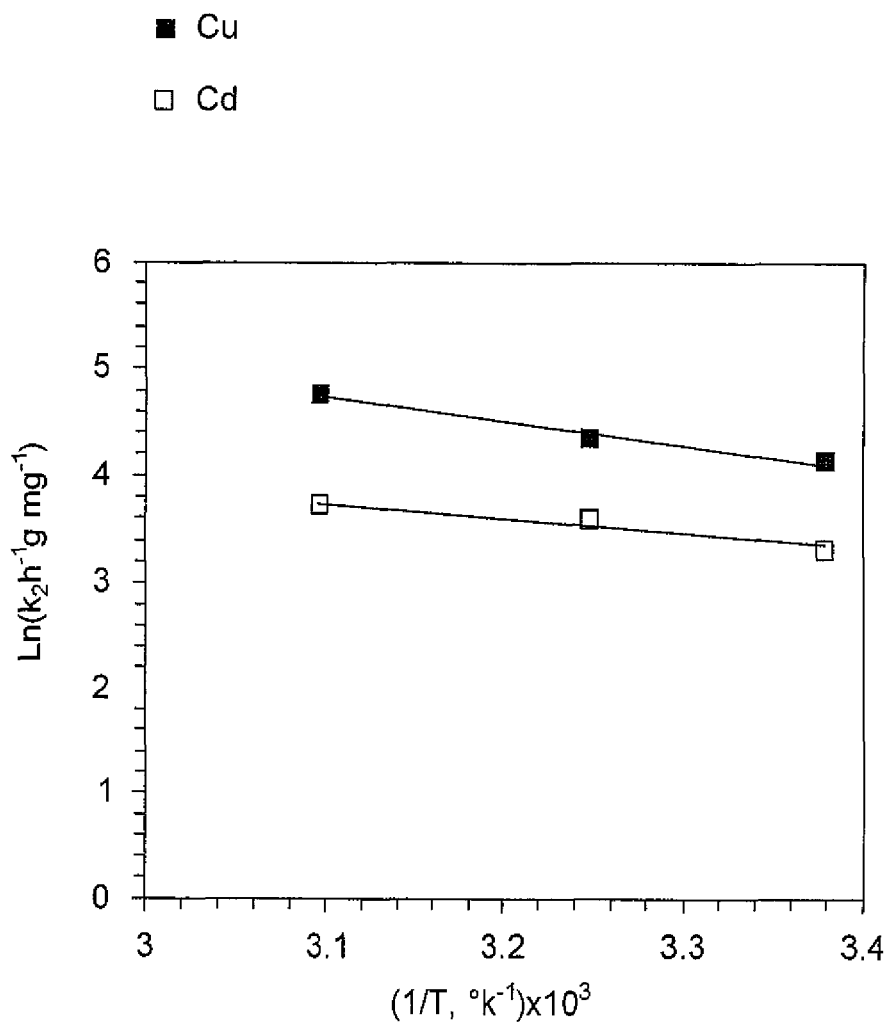
FIG. 7 is an Arrhenius plot showing adsorption activation energy of CAPE 5 for copper and cadmium ions.

The adsorption activation energy can be deduced from the rate constants ($k_2$) obtained from the Lagergren second-order kinetic model using the Arrhenius equation (eq. 4) expressed as:

$$\ln k_2 = \frac{E_a}{2.303RT} + \text{constant} \quad (4)$$

where $k_2$ is the second order rate constant (g mg$^{-1}$ h), $E_a$ the activation energy (kJ mol$^{-1}$), R is the universal gas constant (8.314 J mol$^{-1}$ K), and T is the solution temperature (K). A plot of $\ln k_2$ versus $1/T$ gives a linear plot with slope $-E_a/R$, as shown in FIGS. 7 and 13. The low activation energy values obtained (18.3 and 11.6 kJ mol$^{-1}$) is an indication for the favorability of the adsorption process.

Figure 8A:
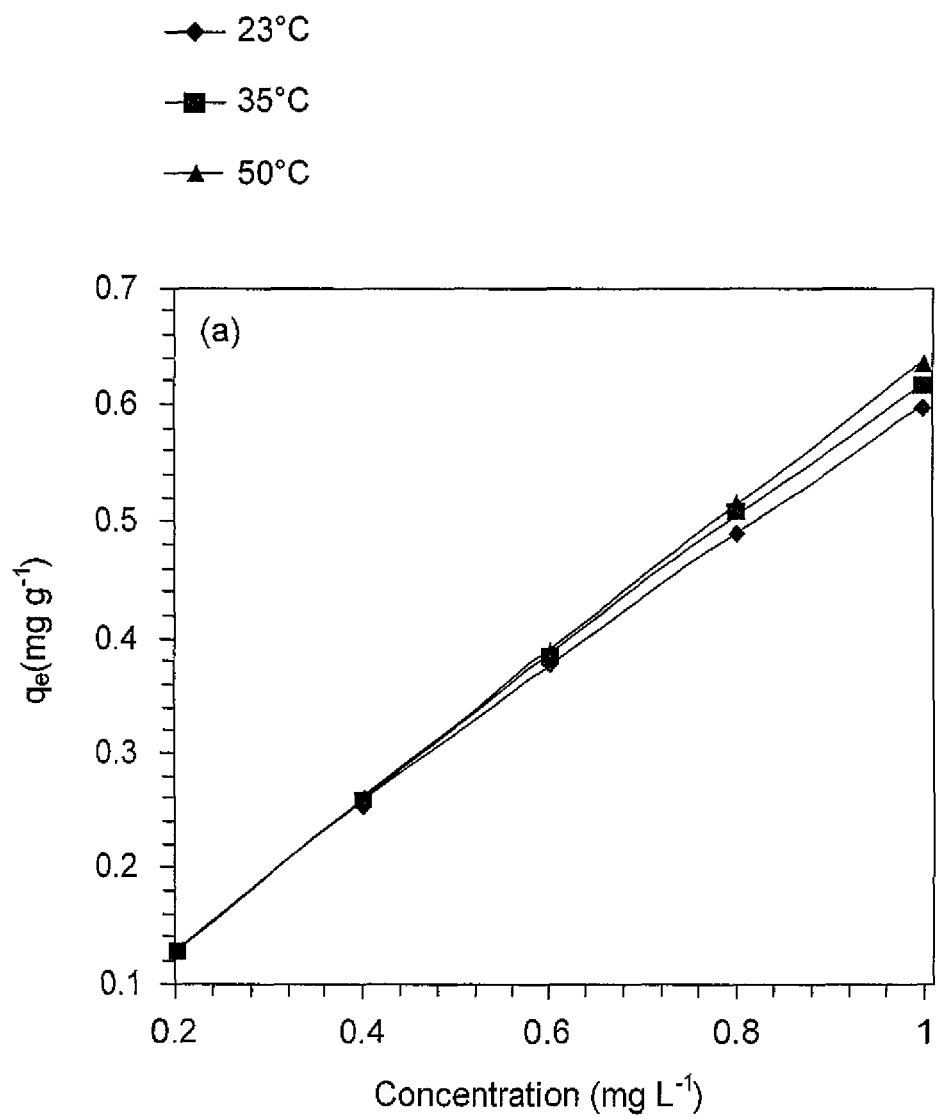
FIG. 8A is a plot showing the effect of copper initial concentration on the adsorption capacity of CAPE 5 at different temperatures.
Figure 8B:
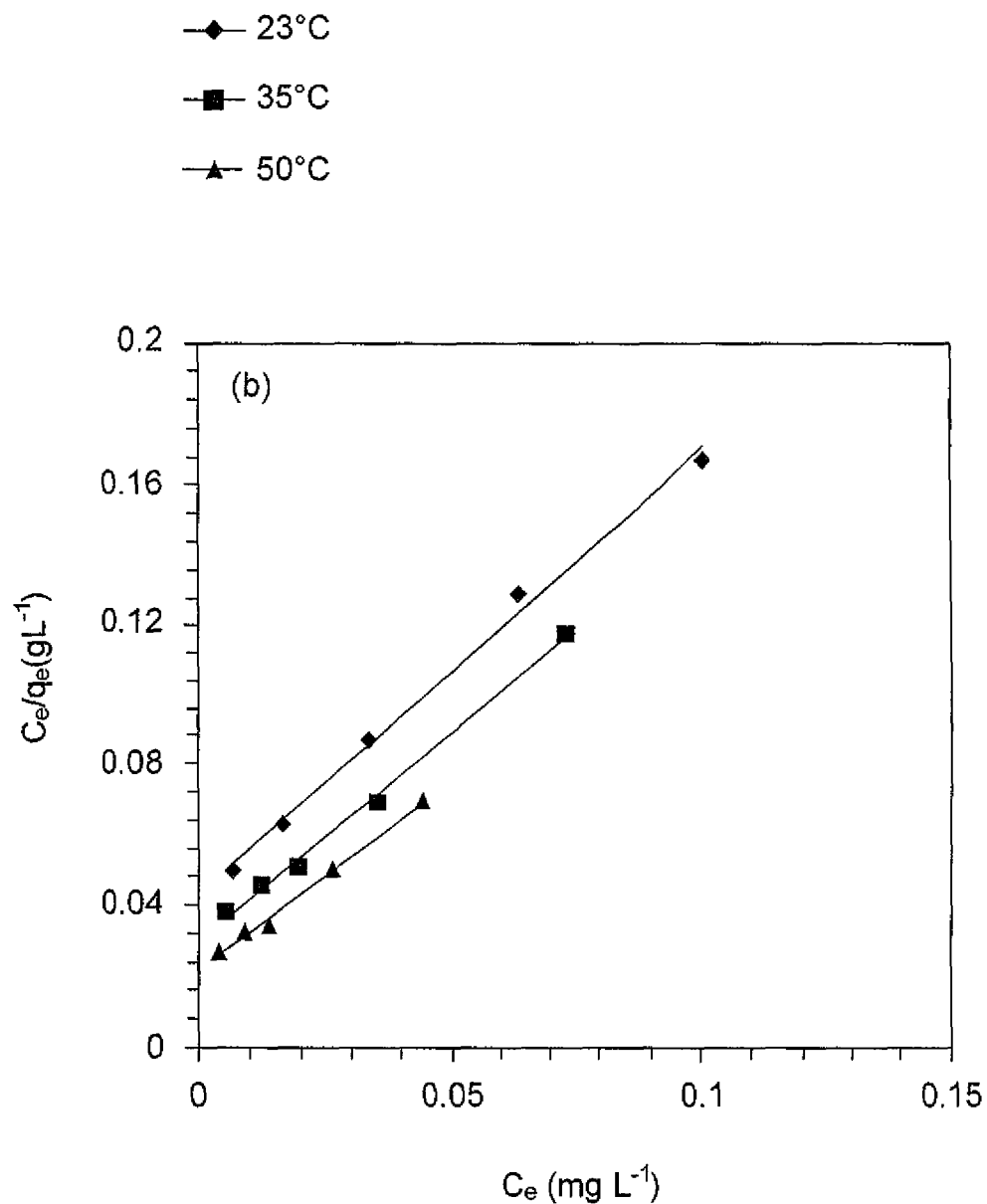
FIG. 8B is a plot showing the Langmuir isotherm model for CAPE 5 with copper.
Figure 9A:
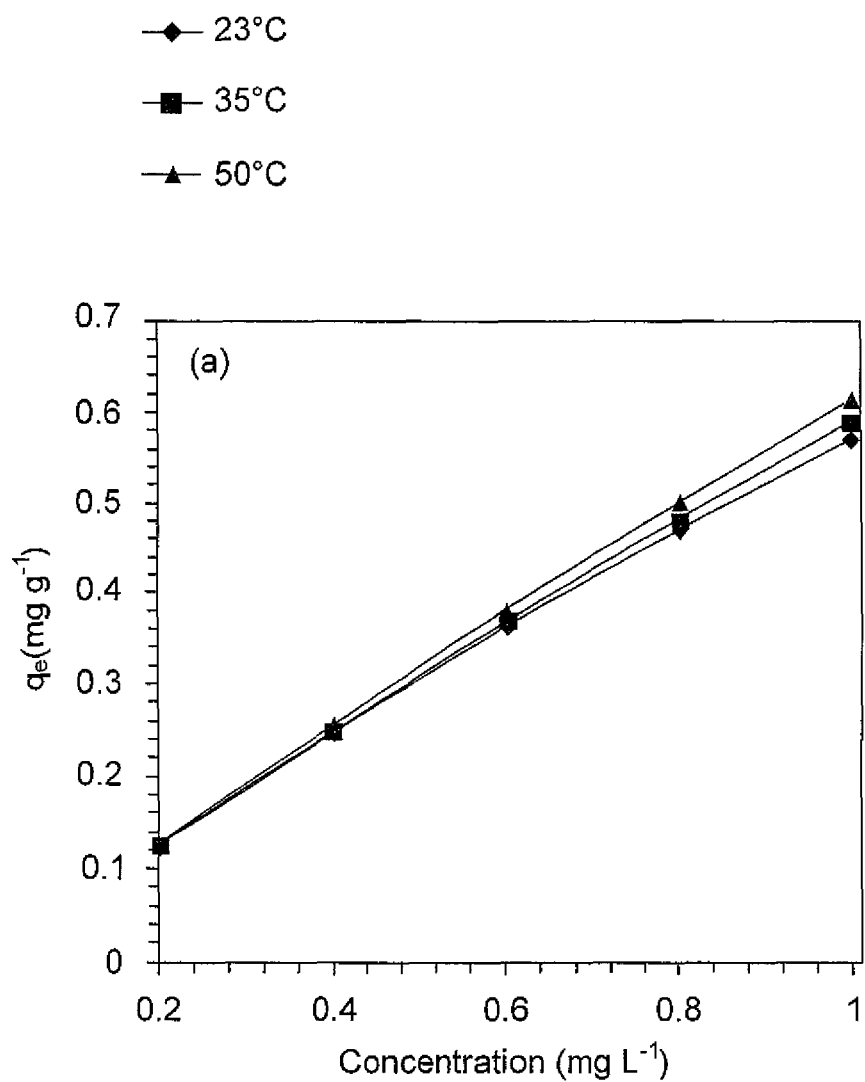
FIG. 9A is a plot showing the effect of cadmium initial concentration on the adsorption capacity of CAPE 5 at different temperatures.
Figure 9B:
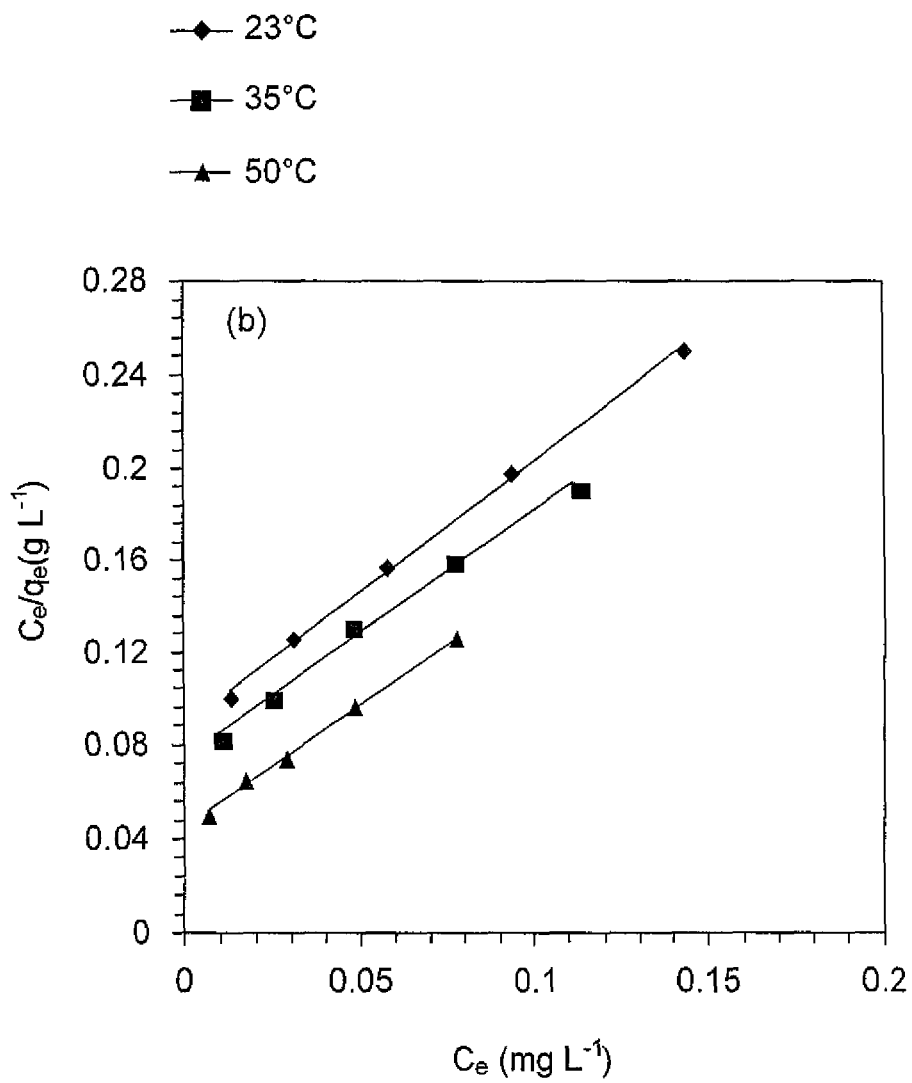
FIG. 9B is a plot showing the Langmuir isotherm model for CAPE 5 with cadmium.

As shown in FIGS. 8A and 9A, the adsorption capacity of CAPE 5 increases with the increase in the initial concentration of $Cu^{2+}$ and $Cd^{2+}$ ions. To further explore the adsorption mechanism, Langmuir and Freundlich models were used to analyze the adsorption data. The Langmuir isotherm equation can be expressed by Eq. (5):

$$\frac{C_e}{q_e} = \frac{C_e}{Q_m} + \frac{1}{Q_m b} \quad (5)$$

where $C_e$ and $q_e$ are the concentrations of metal ion in the solution and resin, respectively, and $Q_m$ and b are the Langmuir constants. FIGS. 8B and 9B illustrate the Langmuir plot of $C_e/q_e$ versus $C_e$, enabling the calculation of Langmuir constants from the intercept and slope of the linear plot (FIG. 16). The Langmuir isotherm model assumes the mechanism of the adsorption process as a monolayer adsorption on completely homogeneous surfaces where interactions between adsorbed molecules are negligible. This empirical model assumes the adsorbed layer is one molecule in thickness, so that adsorption can only occur at a fixed number of definite identical and equivalent localized sites. Once a molecule occupies a site, no further adsorption can take place. This is described as homogeneous adsorption with uniform energies of ion exchange, as all sites possess equal affinity for the adsorbate.

Figure 8C:
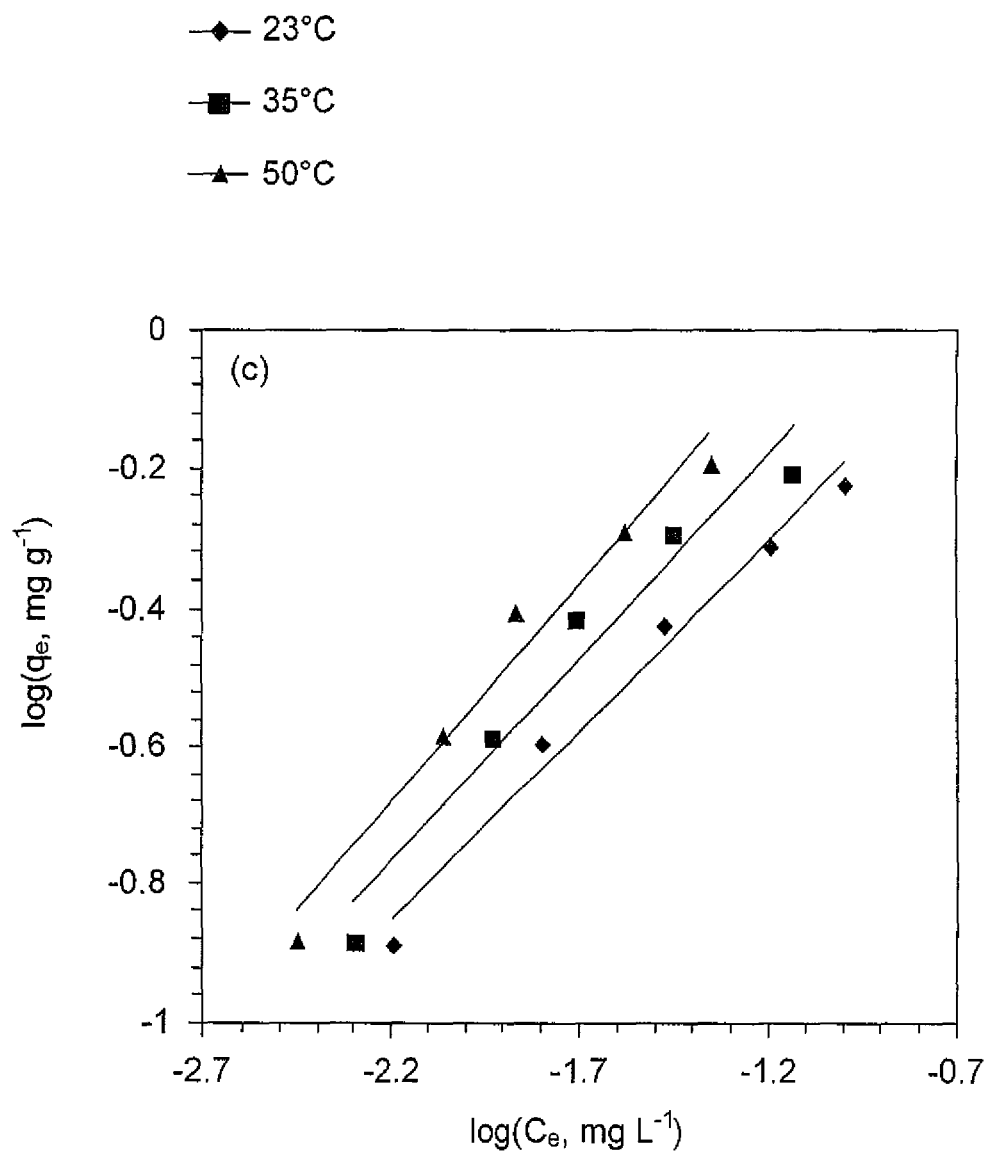
FIG. 8C is a plot showing the Freundlich isotherm model for CAPE 5 with copper.
Figure 9C:
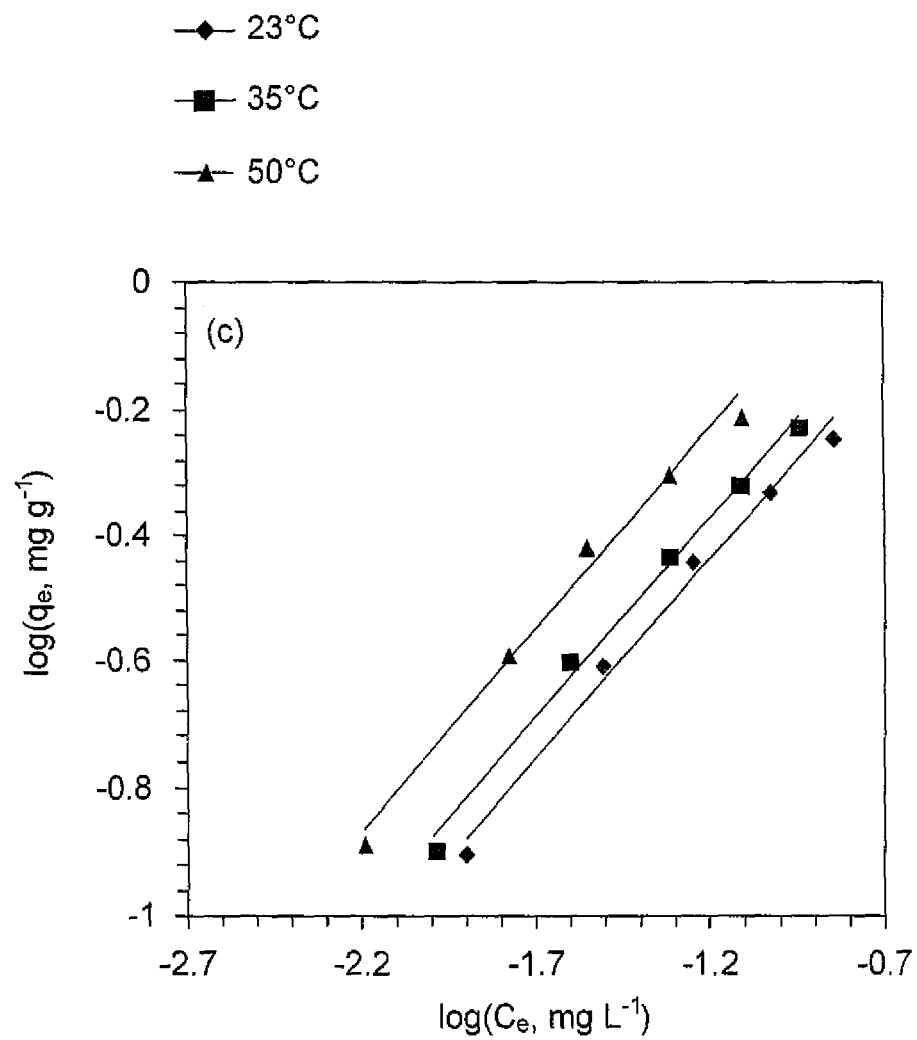
FIG. 9C is a plot showing the Freundlich isotherm model for CAPE 5 with cadmium.

The Freundlich isotherm model, on the other hand, describes non-ideal adsorption occurring on a heterogeneous surface with uniform energy, as well as multilayer adsorption. Eqs. (6) and (7) express the model:

$$q_e = k_f C_e^{1/n} \quad (6)$$

$$\log q_e = \log k_f + \frac{1}{n} \log C_e \quad (7)$$

where $q_e$ and $C_e$ are the equilibrium concentrations of metal ion in the adsorbed and liquid phase, respectively, and $k_f$ and n represent the Freundlich constants (FIG. 16), which can be calculated from the slope and intercept of the linear plot of $\log q_e$ versus $\log C_e$, as presented in FIGS. 8C and 9C. The values of n were determined to be higher than 1. Values lying in the range of 1 to 10 are considered for classification as favorable adsorption. The slope (1/n) range of 0-1 is known to be a measure of adsorption intensity or surface heterogeneity, becoming more heterogeneous as its value gets closer to zero. A 1/n value below unity (all values at different temperature fall within the range of 0-1) is indicative of chemisorption process, whereas 1/n above one implies cooperative adsorption (FIG. 16). For the adsorption of $Cu^{2+}$ ions, the higher values of the constant $k_f$, which is related to adsorption capacity (q), indicates higher affinity of the ions to the adsorbent in comparison to $Cd^{2+}$ adsorption.

For the Langmuir isotherm model, a dimensionless constant ($R_L$), commonly known as the separation factor or equilibrium parameter, can be used to describe the favorability of adsorption on the polymer surface by Eq. (8):

$$R_L = \frac{1}{1 + bC_0} \quad (8)$$

where $C_0$ is the initial $M^{2+}$ concentration and b is the Langmuir equilibrium constant. The more favorable adsorption is reflected by lower $R_L$ values. The adsorption could be either unfavorable ($R_L>1$), linear ($R_L=1$), favorable ($0<R_L<1$), or irreversible ($R_L=0$). The $R_L$ values for the adsorption of both metal ions are given in FIG. 17, which reveals that the values fall in the preferred region (i.e., $0<R_L<1$). The lower values of $R_L$ for the metal adsorption (approaching 0) point toward the irreversible nature of the adsorption. It can be noted in FIG. 17 that the $R_L$ values decrease with the increase in the initial $Cu^{2+}$ and $Cd^{2+}$ concentration, indicating that the ion exchange is more favorable at higher initial concentration. Another factor affecting the adsorptions is the temperature. As shown in FIG. 17, decreasing $R_L$ values with increasing temperatures implies more favorable adsorption at higher temperatures. The greater percentage removal of metal ions at higher temperatures could be attributed to the greater swelling of the cross-linked polymer, allowing a larger amount of metal ions to diffuse through the polymer to reach the active adsorption sites.

Figure 10:
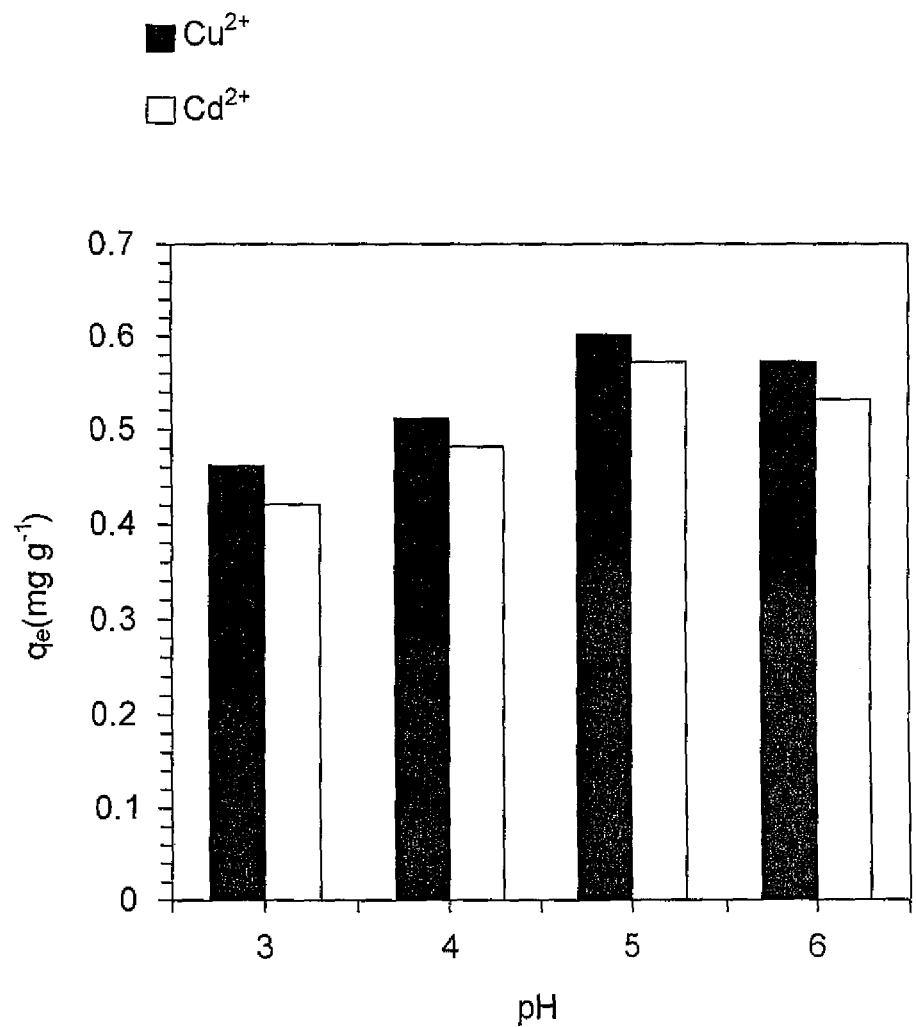
FIG. 10 is a histogram showing the effect of pH on the adsorption capacity of CAPE 5 for $Cu^{2+}$ and $Cd^{2+}$ ions.

The effect pH (in the range 3-6) on the uptake of $Cu^{2+}$ and $Cd^{2+}$ was investigated at a fixed concentration (1 mg $L^{-1}$) and time of 24 h. The pH of the solution was controlled by using an acetate buffer ($CH_3COONa/CH_3COOH$). Results of metal ion uptake at different pH are shown in FIG. 10. Optimum pH was found to be 5. At higher pH values, hydrolysis of the metal ions occurs by the formation of metal hydroxides, which compete with metal ion uptake by the resin.

Figure 11A:
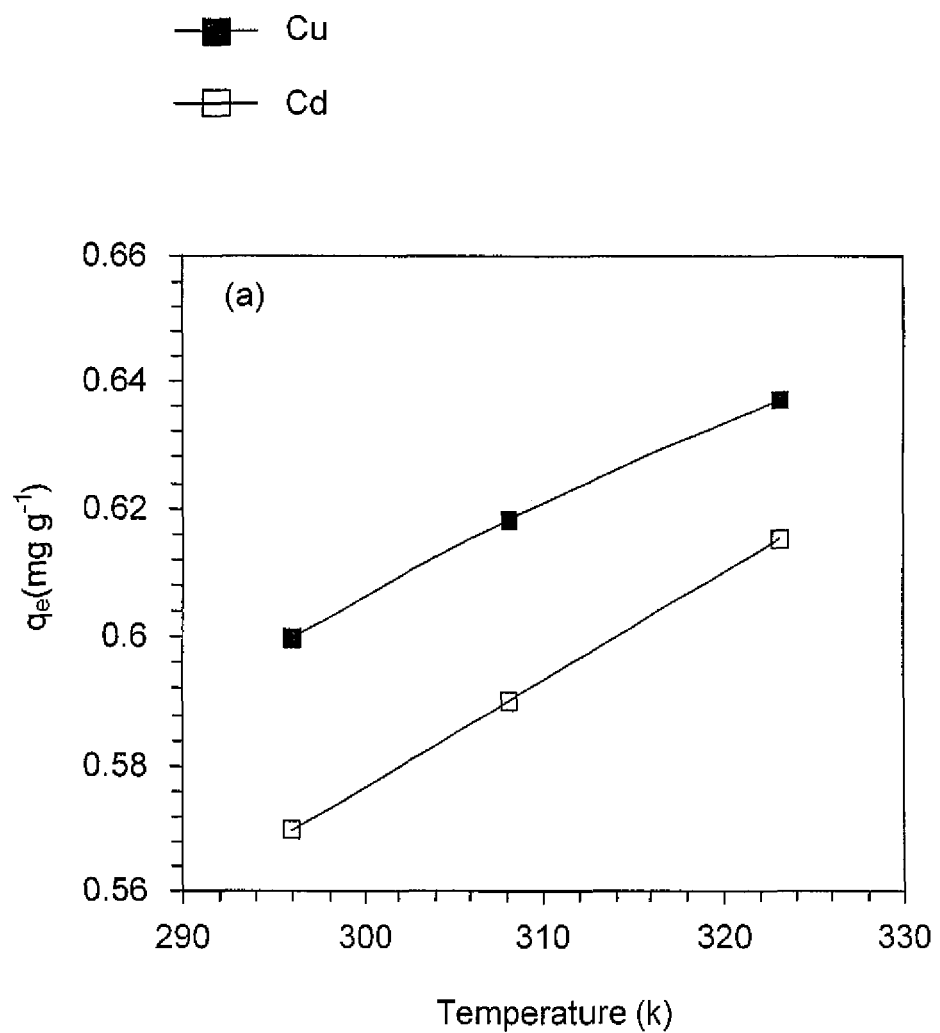
FIG. 11A is a plot showing the effect of temperature on the adsorption capacity of CAPE 5 for copper and cadmium ions.
Figure 11B:
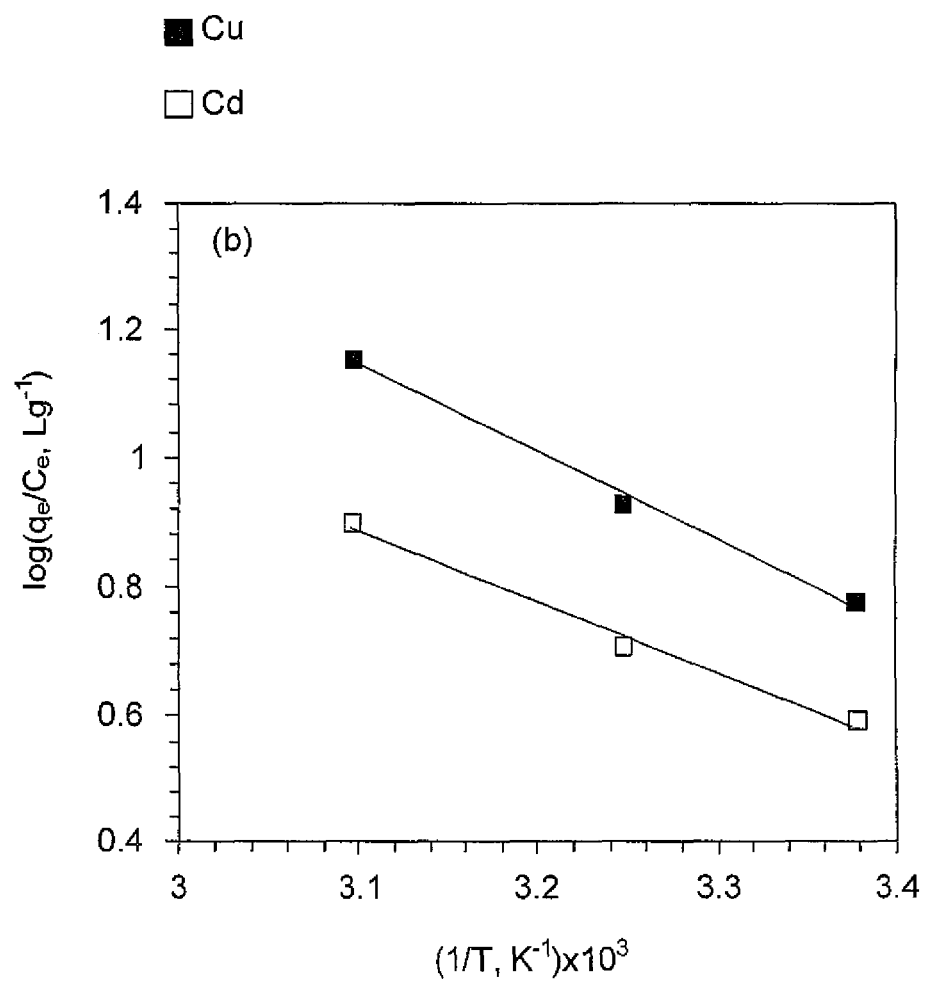
FIG. 11B is the Van't-Hoff plot for CAPE 5.

Adsorption experiments were also performed to obtain the thermodynamic parameters. The results are illustrated in FIG. 11A. The adsorption capacity increases with the increase of temperature, thus suggesting the endothermic nature of the adsorption process. A plot of log ($q_e/C_e$) versus 1/T is displayed in FIG. 11B. The thermodynamic parameters $\Delta G$, $\Delta H$ and $\Delta S$ were calculated using Van't-Hoff equation [Eq. (9)], and are tabulated in FIG. 18. The negative $\Delta G$ values ascertain the spontaneity of the adsorption process.

$$\log\left(\frac{q_e}{C_e}\right) = -\frac{\Delta H}{2.303RT} + \frac{\Delta S}{2.303R} \quad (9)$$

As the temperature increases, the $\Delta G$ values become more negative, indicating that the adsorption process is more favorable at the higher temperatures. Favorable adsorption at higher temperatures is attributed to the greater swelling of the resin and increased diffusion of metal ions into the resin. The positive values of $\Delta H$ certify that the adsorption is an endothermic process. In addition, it can be found in FIG. 18 that the $\Delta S$ values are positive, suggesting that the adsorption is an entropy-driven process, as the randomness increased during the adsorption of metal ions as a result of the release of water molecules from their large hydration shells.

Unloaded and loaded CAPE 5 were investigated by scanning electron microscopy (SEM). Unloaded CAPE 5 resin was immersed in 0.1 M $Cu(NO_3)_2$ for 24 h at a pH of 4, filtered, and dried under vacuum until constant weight was achieved. Loaded and unloaded CAPE 5 were then sputter-coated for 6 min with a thin film of gold.

Figure 12A:
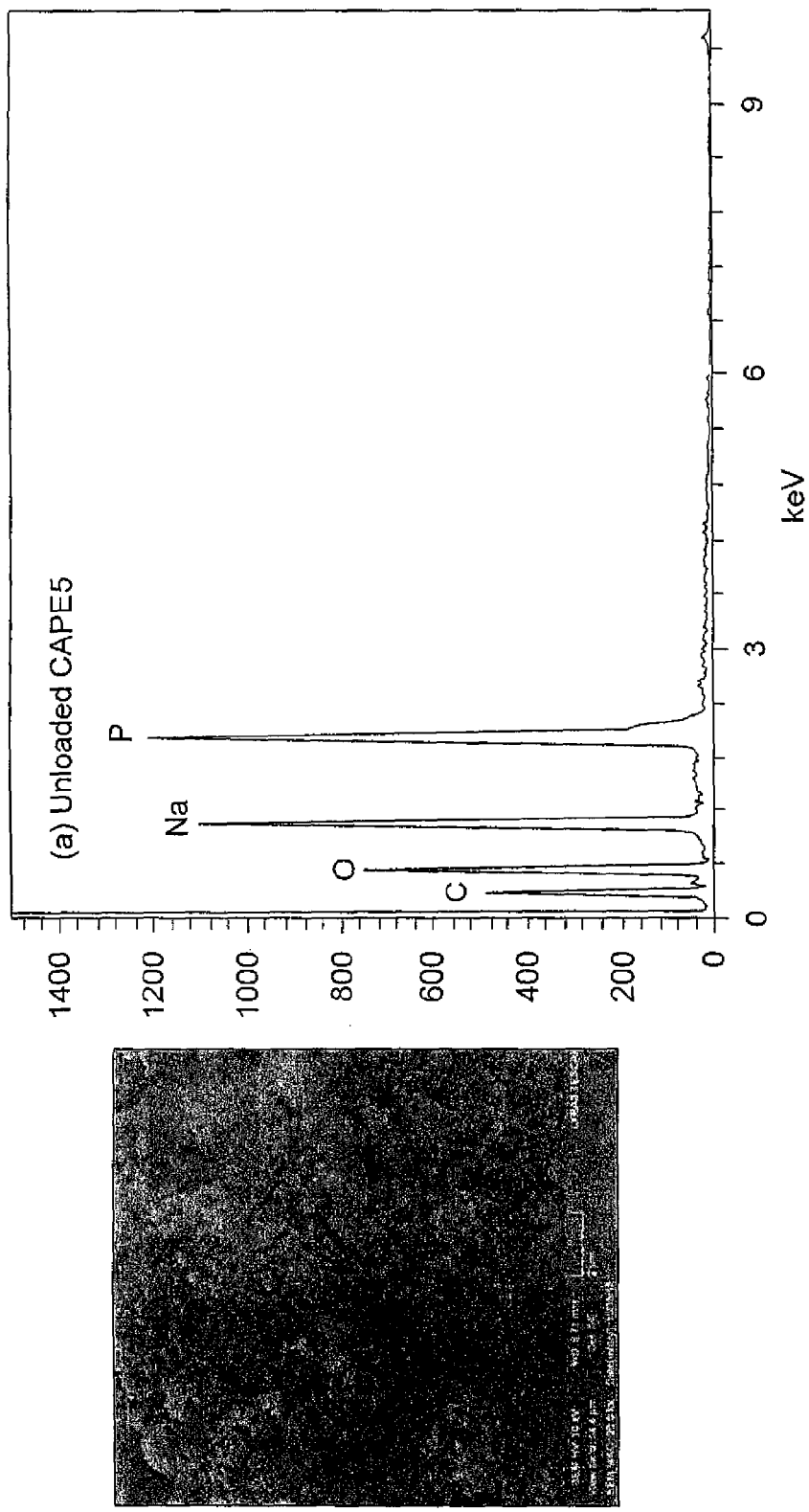
FIG. 12A shows the SEM and EDX images for unloaded CAPE 5.
Figure 12B:
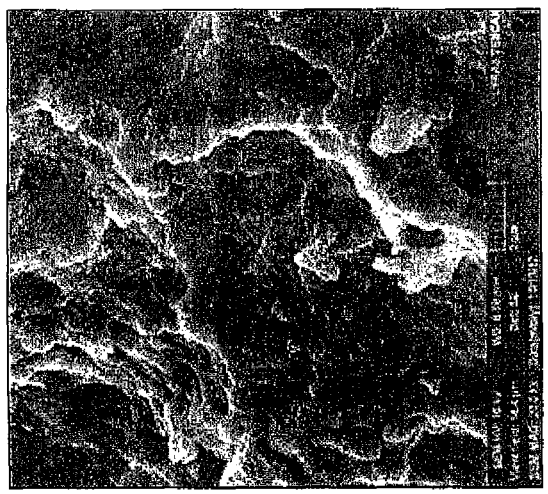
FIG. 12B shows the SEM and EDX images for CAPE 5 loaded with copper ions.
Figure 12B:
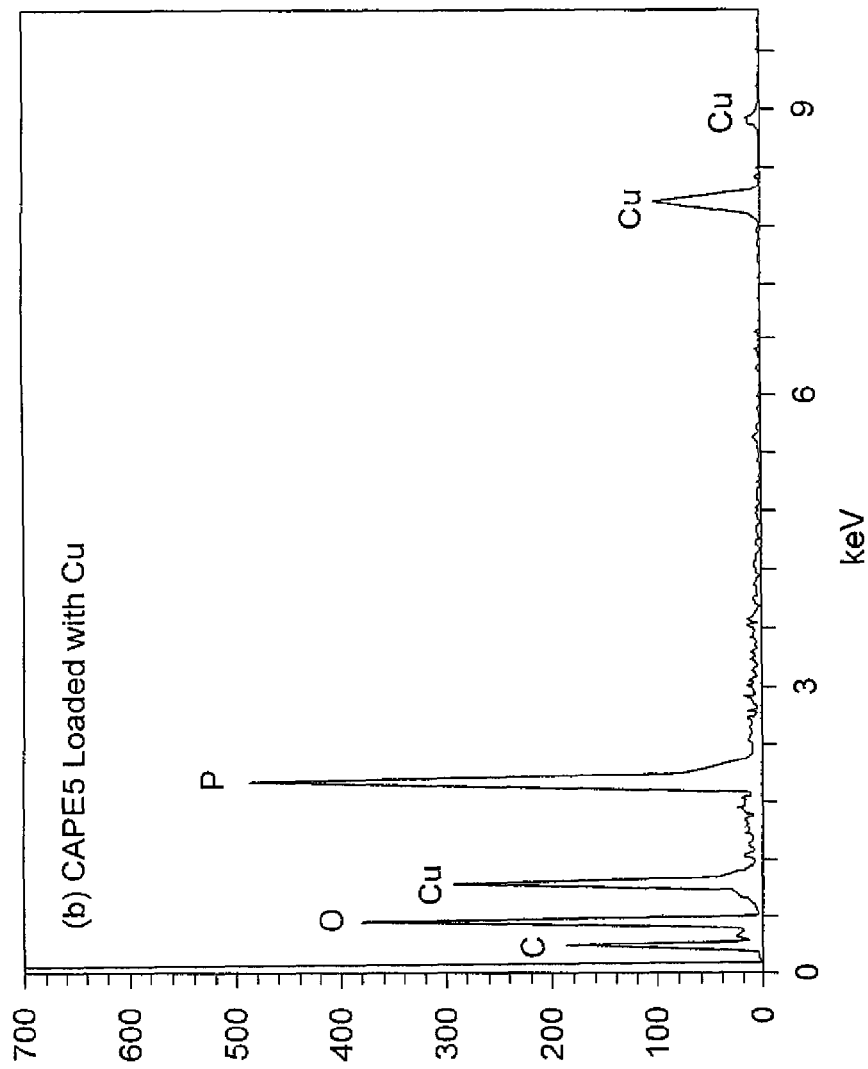
Figure 12C:
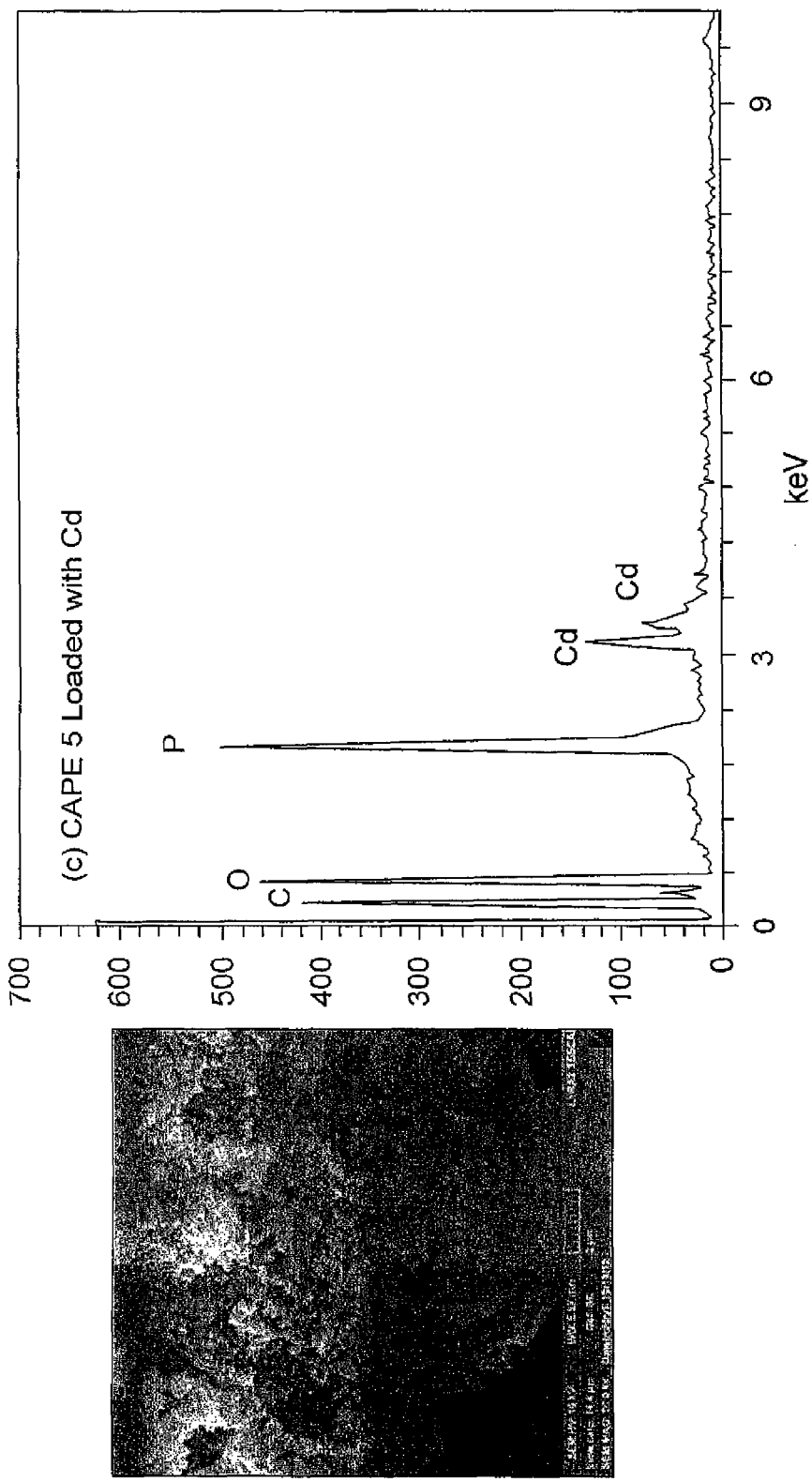
FIG. 12C show SEM and EDX images for CAPE 5 loaded with cadmium ions.

SEM and EDX images (FIGS. 12A-12C) show that the morphology has been altered by the adsorption of copper and cadmium ions (cracked morphology to smooth). The EDX analysis (FIG. 12A) shows that unloaded CAPE 5 composition was similar to that proposed in FIG. 1. Also, FIGS. 12B and 12C shows that the copper and cadmium metal ions displaced the sodium ions in CAPE 5, confirming the adsorption of the metal ions. The color of the resins has also changed from white to blue after adsorbing copper ions, but stayed white after the adsorption of cadmium ions, giving a positive indication that the adsorption process has occurred. The SEM and EDX confirmed that CAPE 5 could be used as an efficient adsorbent of $Cu^{2+}$ and $Cd^{2+}$ in aqueous solutions at low concentrations.

In the following examples, elemental analysis was carried out on a Perkin Elmer Elemental Analyzer Series II Model 2400. IR spectra were recorded on a Perkin Elmer 16F PC FTIR spectrometer. $^1H$ and $^{13}C$ spectra were measured on a JEOL LA 500 MHz spectrometer using HOD signal at 64.65 and dioxane signal at 67.4 ppm as internal standards, respectively. Scanning electron microscopy images were taken by TESCAN LYRA 3 (Czech Republic) equipped with Oxford, energy-dispersive X-ray spectroscopy (EDX) detector model X-Max. Atomic absorption spectroscopy (AAS) analysis were performed using AAS model iCE 3000 series (Thermo Scientific). Thermogravimetric analysis (TGA) was performed using a thermal analyzer (STA 429) manufactured by Netzsch (Germany). The polymer sample to be tested (usually ~5 mg) was placed in a platinum crucible. Aluminum oxide ($Al_2O_3$; ~4 mg) was placed in an identical platinum crucible as a reference sample. With the sample carrier system, which had two sets of 10% Pt—Pt/Rh thermocouples, the sample carrier was placed in the middle of the vertical furnace, which was programmed and controlled by a microprocessor temperature controller. The temperature was raised at a uniform rate of 10° C./min. The analyses were made over a temperature range of 20-800° C. in an air atmosphere flowing at a rate of 100 mL/min.

Tertiary butylhydroperoxide (TBHP) (70% in water), parafomaldehyde, phosphorous acid from Fluka Chemie AG (Buchs, Switzerland) and phosphorous trichloride from BDH laboratory reagents (England) were used as received. All solvents used were of analytical grade.

Example 1

Diallylformamide

Monomer 1

Diallylformamide has been synthesized as described in Ploger et al., Z Anorg. Allg. Chem. 389 (1972) 119-128.

Example 2

Diallylaminomethyldiphosphonic Acid

Monomer 2

Diallylaminomethyldiphosphonic acid 2 has been synthesized as described in the literature, with some modification in the isolation method. Thus, as shown in FIG. 1, diallylformamide (1) (0.5 mol) and phosphorous acid (0.5 mol) were mixed in a round bottom flask (1 L). Under ice-cooling, phosphorous trichloride (0.5 mol) was added dropwise to the mixture in the round bottom flask. After completion of the addition, the temperature was increased to 70° C. until no further HCl gas was liberated. The reaction mixture was left at room temperature for 24 h, during which the product became a glassy solid. The product was hydrolyzed with water (100 mL) and freeze-dried. The residual glassy material was crystallized using acetone-methanol mixture to give monomer 2 as a white solid, whose purity was confirmed by $^1H$ NMR spectroscopy.

Example 3

1,1,4,4-tetraallylpiperazinium dichloride

Monomer 3

Monomer 3, the cross-linker, has been synthesized as described in Ali et al., J. Appl. Polym. Sci. 61 (1996) 1077-1085.

Example 4

Synthesis of CPZA 4

As shown in FIG. 1, to a solution of monomer 2 (14.6 g, 54 mmol) and monomer 3 (1.920 g, 6 mmol) in deionized water (8.92 g) under $N_2$ was added the initiator TBHP (320 mg). The reaction mixture in the closed flask was stirred using a magnetic stir-bar at 85° C. for 24 h. Within 3-4 h, the stir-bar stopped moving and the mixture became white solid. At the end of the elapsed time, the cross-linked polyzwitterionic acid CPZA 4 that formed was allowed to soak in water (48 h) with replacement of water several times. The white solid was filtered and dried under vacuum at 70° C. to a constant weight (57% yield). (Found: C, 33.7; H, 6.1; N, 5.4%. A copolymer from monomer 2 ($C_7H_{15}NO_6P_2$) (90 mol %) and monomer 3 ($C_{16}H_{28}Cl_2N_2$) (10 mol %) requires C, 33.93; H, 5.91; N, 5.53%); $v_{max}$ (KBr) 3428, 2935, 1652, 1469, 1188, 1075, 912, 805, 708, 568 and 534 cm$^{-1}$.

Example 5

Synthesis of CAPE 5

As shown in FIG. 1, a mixture of cross linked polyzwitterionic acid 4 (5.0 g, ~18 mmol) in a solution of NaOH (4.4 g, 110 mmol) in water (150 cm$^3$) was stirred at room temperature for 24 h. The polymer then poured into methanol (300 mL), then filtered and dried under vacuum at 65° C. to a constant weight to give the cross-linked polyelectrolyte CAPE 5 (4.8 g).

Ion exchange capacity (IEC) was determined by titrimetric analysis method (Eq. 10). The dried and weighed polymer (50 mg) was immersed in 50 ml of 0.1 M hydrochloric acid solution for 24 h. The ion exchange capacity was determined from the decrease in acidity by titration with 0.1 M NaOH solution.

$$IEC = \frac{mmol_i - mmol_f}{W} \quad (10)$$

where $mmol_i$ and $mmol_f$ are the initial and final amount of HCl in mmol, respectively, and W is the weight of the polymer in g.

The procedure for the adsorption experiments of the cross-linked polymer CAPE 5 for $Cu^{2+}$ ions can be described as follows. A mixture of CAPE 5 (30 mg) in a 1 mg L$^{-1}$ of $Cu^{2+}$ (20 ml) prepared from $Cu(NO_3)_2$ standard solution was stirred using a magnetic stir-bar at different pH for 24 h. Then the mixture was filtered, and the filtrate was analyzed by AAS to determine the amount of $Cu^{2+}$ that remained. The adsorption capacity ($q_{Cu^{2+}}$) in mg g$^{-1}$ can be calculated using equation (11):

$$q_{Cu^{2+}} = \frac{(C_0 - C_f)V}{W} \quad (11)$$

where $C_0$ and $C_f$ are the initial and final concentration of $Cu^{2+}$ ions in mg/L, respectively, W is the weight of the polymer in g, and V is the volume of the solution in L. Data presented are the average of triplicate runs and varied by less than 4% in all the cases studied.

For adsorption kinetic studies, the CAPE 5 sample was stirred in a 1 mg L$^{-1}$ $Cu^{2+}$ solution for different adsorption times at a preferred pH. Adsorption isotherms were constructed by changing the concentration of the $Cu^{2+}$ solution from 200 μg L$^{-1}$ (i.e., ppb) to 1000 μg L$^{-1}$ at 25° C. for 24 h. Based on the adsorption data from experiments carried out at different temperatures, the activation energy for the adsorption process and thermodynamic parameters ΔG, ΔH and ΔS for $Cu^{2+}$ removal were calculated. Similar experiments were conducted for the removal of $Cd^{2+}$ ions.

Novel cross-linked polyaminomethyldiphosphonates were prepared from inexpensive starting materials. The CAPE 5 resin was found to have a very good adsorption capacity for $Cu^{2+}$ and $Cd^{2+}$ ions. The adsorption followed Lagergren second-order kinetic model and Langmuir as well as Freundlich isotherm models. The negative ΔGs and positive ΔHs ensured the spontaneity and the endothermic nature of the adsorption process. The good adsorption efficiencies imply the efficacy of CAPE 5 in removing $Cu^{2+}$ and $Cd^{2+}$ ions from aqueous solution at low concentration.

It is to be understood that the present invention is not limited to the embodiments described above, but encompasses any and all embodiments within the scope of the following claims.

We claim:

1. A cross-linked polyaminodiphosphonate for the removal of metal ions from wastewater, comprising a compound having the formula:

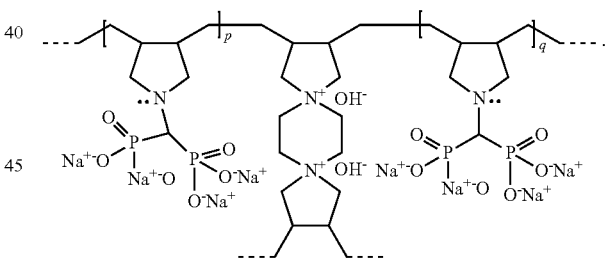

2. A cross-linked polyzwitterionic acid having the formula:

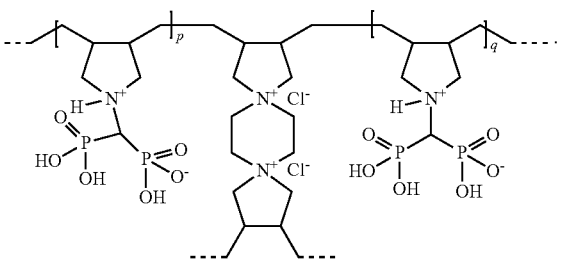

* * * * *